(12) United States Patent
Longley

(10) Patent No.: US 7,464,997 B2
(45) Date of Patent: Dec. 16, 2008

(54) LOAD BEARING CRAWLER ASSEMBLY

(75) Inventor: Jonathan T. Longley, Lexington, MA (US)

(73) Assignee: Raytheon Company, Waltham, MA (US)

( * ) Notice: Subject to any disclaimer, the term of this patent is extended or adjusted under 35 U.S.C. 154(b) by 206 days.

(21) Appl. No.: 11/195,149

(22) Filed: Aug. 2, 2005

(65) Prior Publication Data

US 2007/0029877 A1 Feb. 8, 2007

(51) Int. Cl.
*B62D 55/08* (2006.01)
*B65G 7/02* (2006.01)

(52) U.S. Cl. .................... 305/128; 305/142

(58) Field of Classification Search ............. 305/120, 305/121, 122, 124, 125, 127, 128, 129, 132, 305/142, 20, 130, 131, 144; 180/9.5, 9.54
See application file for complete search history.

(56) References Cited

U.S. PATENT DOCUMENTS

| | | | | | |
|---|---|---|---|---|---|
| 1,301,040 | A | * | 4/1919 | Colahan | 305/132 |
| 1,336,961 | A | * | 4/1920 | Holt | 305/125 |
| 2,184,441 | A | * | 12/1939 | Smellie et al. | 15/362 |
| 3,107,924 | A | * | 10/1963 | Cushman | 280/28.5 |
| 3,692,132 | A | * | 9/1972 | Pollanen | 180/193 |
| 4,082,371 | A | * | 4/1978 | Werner et al. | 305/109 |
| 4,088,337 | A | * | 5/1978 | Larsen et al. | 280/79.11 |
| 4,500,139 | A | * | 2/1985 | Tucek | 305/128 |
| 4,579,182 | A | * | 4/1986 | Dewing et al. | 180/9.46 |
| 4,823,852 | A | * | 4/1989 | Langford | 144/4.1 |
| 4,854,805 | A | | 8/1989 | Althoff et al. | |
| 5,176,573 | A | * | 1/1993 | Dow | 460/42 |
| 5,337,847 | A | * | 8/1994 | Woods et al. | 180/9.52 |
| 6,050,355 | A | | 4/2000 | Beck, Jr. | |
| 6,105,699 | A | * | 8/2000 | Hinds | 180/89.14 |
| 6,158,539 | A | * | 12/2000 | Isley | 180/89.14 |
| 6,325,167 | B1 | * | 12/2001 | Jiang | 180/9.32 |

FOREIGN PATENT DOCUMENTS

| | | |
|---|---|---|
| DE | 1 756 761 A1 | 5/1970 |
| DE | 1756761 * | 5/1970 |
| DE | 1 956 487 | 6/1970 |
| DE | 3402694 A1 | 8/1984 |
| FR | 2 551 034 | 4/1983 |
| JP | 02102883 A * | 4/1990 |

OTHER PUBLICATIONS

PCT/US2006/026960 International Search Report dated Nov. 30, 2006.

(Continued)

*Primary Examiner*—Russell D Stormer
*Assistant Examiner*—Kip T Kotter
(74) *Attorney, Agent, or Firm*—Daly, Crowley, Mofford, & Durkee, LLP

(57) ABSTRACT

A crawler apparatus capable of being moved along a surface including a frame having first and second ends, a first end roller coupled to the frame and disposed adjacent the first end of the frame, a second end roller coupled to the frame and disposed adjacent to the second end of the frame, and a belt having an inner side capable of contacting each respective roller and an outer side capable of contacting the surface.

31 Claims, 15 Drawing Sheets

OTHER PUBLICATIONS

Hilman Rollers, ERS Series Deluxe Kit, p. 1.
Hilman Rollers, Industrial Rollers, pp. 1-4.
Hilman Rollers, FT Series Kits & Sets, Marlboro, NJ, pp. 1-5.
Hilman Rollers, SHD.SHD-B Series, p. 1.
Hilman Rollers, 200 Ton Capacity XYS Series Roller, p. 1.
Hilman Rollers, XYS Roller Series, Marlboro, NJ, pp. 1-2.
Hilman Rollers, (Top) OTB Style Roller With End Mount Plates (Bottom) OT Style Roller, OT/OTB T/TB, NT/NTB Series, p. 1.
Hilman Rollers, Spec Sheet, OT/OTB—T/TB—NT/NTB Series, Marlboro, NJ, p. 1.
Hilman Rollers, Wide Body Series, p. 1.
Hilman Rollers, ERF Roller, ERF Series, p. 1.
Hilman Rollers, (top) Neoprene Pad (bottom) OT Roller With Fabric Preload Pad and Connection Hardware, Preload Pads, p. 1.
Hilman Rollers, P Data Sheet, Elastometric Preload Pads for Hilman Rollers, Marlboro, NJ, pp. 1-2.
Hilman Rollers, FP Data Sheet, Fabric Preload Pads for Hilman Roller, Marlboro, NJ, p. 1-2.

* cited by examiner

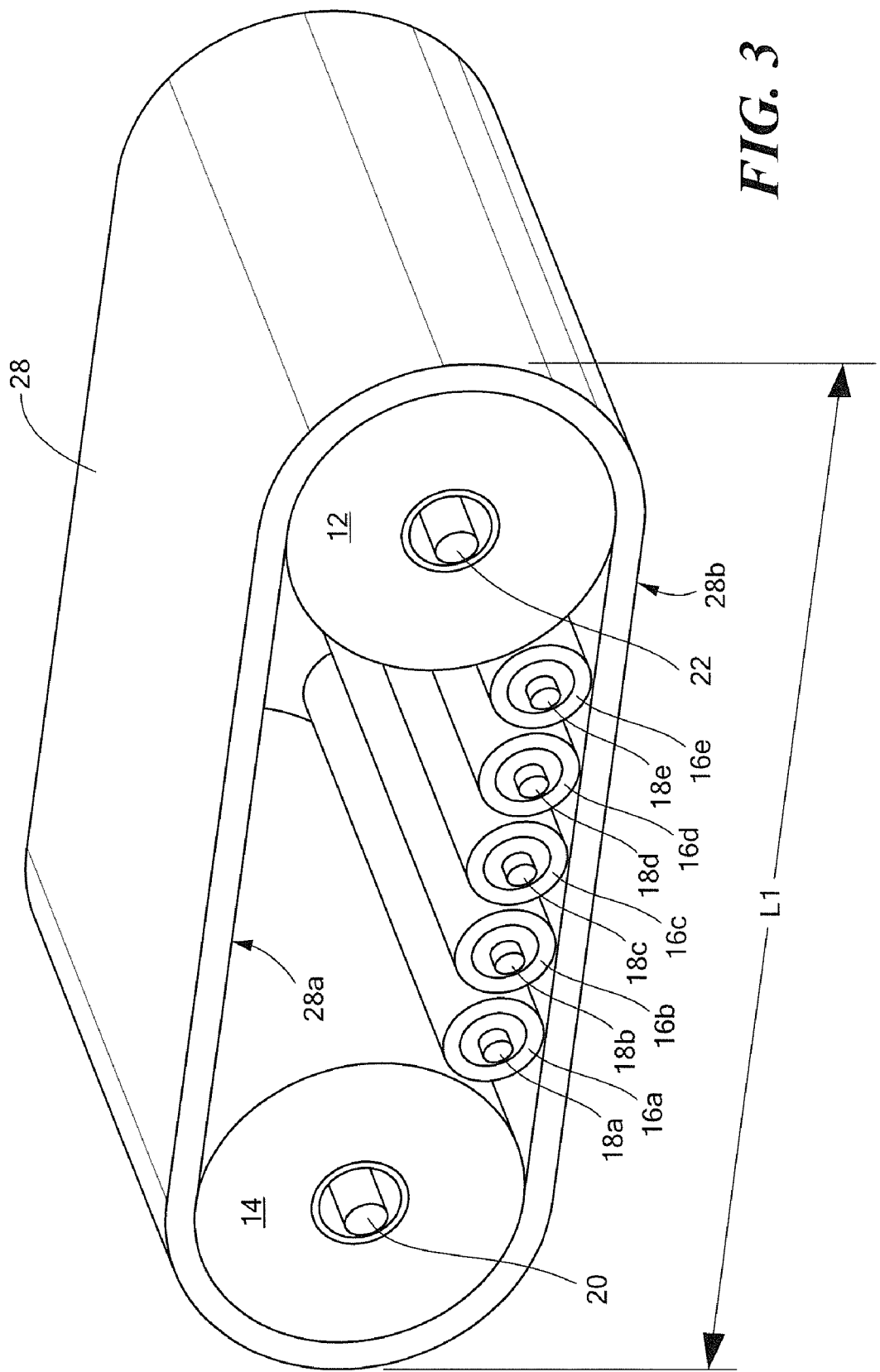

LOAD BEARING CRAWLER ASSEMBLY

CROSS REFERENCE TO RELATED APPLICATIONS

Not Applicable

STATEMENT REGARDING FEDERALLY SPONSORED RESEARCH

Not Applicable.

FIELD OF THE INVENTION

The present invention relates generally to load bearing mechanisms and more particularly to a load bearing crawler mechanism.

BACKGROUND OF THE INVENTION

Common cargo carrying pallets are well known to those of reasonable skill in the art and can be used for moving large and/or heavy loads. One disadvantage of cargo carrying pallets is poor mobility. In many cases a forklift or forktruck is required to maneuver the carrying pallet from one location to another. Providing the carrying pallet with wheels to enhance mobility of the pallet can result in increased mobility of the carrying pallet; however, providing wheels on the pallet can also result in a high load bearing concentration between the wheel(s) of the pallet and the floor, be it a factory concrete floor, asphalt driveway, earth, or the floor of an aircraft cargo area. As a direct result of the high load bearing concentration, the floor can be physically damaged or prematurely worn.

Further, for tire-like wheels, the load carrying strength of a pallet with wheels tends to be limited by both the bearing strength of the tire material and the tire pressure of the wheels; i.e., the maximum contact pressure along an area of contact between a wheel and a surface it is traveling over is roughly equivalent to the tire pressure. Tire-like wheels have some ability to "deform" or compress to help distribute weight, but to carry very heavy loads, very large tires with large diameters may be required to have the larger contact areas that can potentially expand upon compression. A cargo carrying pallet with such large tires tends to sit fairly high off the ground, which can be less stable and also can be a disadvantage in environments (e.g., ship hulls, aircraft cargo areas, truck cargo carrying areas, fitting under doorways, etc.) where space is limited.

Another apparatus used to move large and/or heavy loads is a frame or so-called "skate" or "dolly" to which one or more rollers are mounted. Handles connected to the frame enable it to be pushed or pulled along a floor. For example, Hillman Rollers, of New Jersey manufactures frames that employ multiple-roller load bearing mechanisms and assemblies. Most of the roller systems available from Hilman are all steel (although some are nylon), and operate based on the principle of the recirculating chain. This chain is constructed with a series of connected rolls that recirculate around a central load plate set into a framework. The frame acts only to hold the load plate in place, and can include a top plate to ease connection to the load. The rolls spread the load evenly on the load surface providing a low friction, controllable, high capacity moving device.

Although the frame plus roller approach effects some improvement in load distribution (as compared with, a wheel attached to a conventional pallet) by creating a surface interface consisting of several lines of contact, disadvantages still persist. The rollers themselves, as well as the recirculating chain, can collect dirt and debris. On rough surfaces, the lines of contact between the rollers and the rough surface can diminish virtually to merely points of contact, which can cause some rollers to lose all contact with a surface and put stress on the rollers remaining in contact. Known frame/roller systems are also disadvantageous in situations such as abrupt changes in surface inclination (such as transitions onto and off of ramps) or any other forms of surface imperfection, such as small rocks on or cracks in a surface over which the roller is traversing. Further, rollers made of materials like steel are capable of causing permanent damage to flooring such as aluminum (often found in aircraft) or linoleum and vinyl (often found in commercial storage areas).

Another limitation of known systems for moving loads is compatibility with different types of interfaces and loading systems, some of which may be at different elevations. For example, a load may need to be transported between rails and an aircraft, or a tarmac and an aircraft, a dock and a vessel, etc., and these different interfaces may not be compatible with a given pallet system. Systems usable on flat surfaces may be incompatible with rail based systems (and vice versa). Some systems may be constrained to specific domains of motion and cannot, for example, be dragged across a tarmac or other surface. An additional problem is the heavy weight and/or materials used in many transport systems often can cause damage to and/or reduce the working life of the surfaces being traversed, especially when a load is heavy or experiences vertical motion or shock (e.g., when an aircraft lands, when a load is being carried by a vehicle or other conveyance that is traversing over an irregular surface, such as a bump, choppy water, etc., traverses over a bump, etc.).

SUMMARY OF THE INVENTION

The embodiments of the invention described herein help to reduce and/or overcome at least some of the limitations and disadvantages described above.

For example, at least some embodiments of the invention provide a load bearing crawler apparatus that can be useful to provide mobility to heavy objects without substantial damage to the surface over which the apparatus travels, such as by distributing the load bearing weight of the heavy object over a larger contact surface. Advantageously, at least some embodiments of the invention include a plurality of rollers wrapped by a belt, where the belt is constructed from materials and is designed to have a size that enables the rollers contacting the belt to produce a loading pattern that reduces contact pressure (with a surface) while still maintaining mobility and load carrying capacity.

In one embodiment, the invention provides a crawler apparatus capable of being moved along a surface, the crawler apparatus comprising a frame, a first end roller, a second end roller, and a belt. The frame has first and second ends. The first end roller is coupled to the frame and disposed adjacent the first end of the frame, and the first end roller comprises a first material. The second end roller is coupled to the frame and is disposed adjacent to the second end of the frame. The second end roller comprises a second material. The belt has an inner side capable of contacting each respective roller and an outer side capable of contacting the surface, the belt being disposed about at least a portion of the first end roller and at least a portion of the second end roller so as to have a slack limited enough to permit substantially continuous contact of the belt with at least a portion of the first and second rollers and to produce a respective inner band of contact between the inner side of the belt and each respective roller and to produce a respective outer band of contact between the outer side of the belt and the surface.

The frame can be capable of being coupled to a load, wherein, when the load is coupled to the frame, the first end roller, the second end roller, and the band distribute the load to the surface along each respective outer band of contact. At least one of the following can be selected to ensure that a contact pressure along each respective outer band of contact does not cause undesired damage (e.g., at least one of permanent damage, temporary damage, scratching, denting, pitting, denting, scuffing, denting, and exceeding a predetermined level of contact pressure) to the surface:

(a) the size at least one of the first and second rollers;
(b) the first material;
(c) the second material;
(c) the spacing between the first and second end rollers;
(d) the material from which the belt is made;
(e) the thickness of material from which the belt is made; and
(f) the flexibility of the material from which the belt is made The belt can comprise a material having a hardness less than a hardness of the surface over which the crawler apparatus is disposed, is to be moved, or is being moved, a material capable of recovering its shape after being deformed, and/or an elastomeric material. The belt comprises at least one of nylon; TEFLON; polyethylene; natural rubber; synthetic rubber; neoprene; chloroprene; urethane; polyurethane rubber; butyl rubber nitrile rubber; ethylene propylene diene monomer (EPDM) rubber; nitrile-butadiene rubber; styrene-butadiene rubber; silicone room temperature vulcanizing (RTV) rubber; fluorosilicone rubber; poly(styrene-butadiene) rubber (SBR); polychloroprene (CR); ethylene-propylene rubber (EPR); and thermoplastic elastomer (TPE).

In a further aspect, the crawler apparatus can further comprise an idler roller coupled to the frame and disposed between the first and second end rollers, the idler roller spaced a distance away from the belt and comprising a fourth material. The idler roller can be coupled to the frame such that the idler roller remains spaced a distance away from the belt when the crawler apparatus is disposed on, is moving along, or being moved along a substantially flat surface and is not experiencing motion or shock normal to the substantially flat surface. In addition, the idler roller contacts the belt at least once and produces a respective inner band of contact between the roller side of the belt and the idler roller, when at least one of the following conditions exists:

(a) the crawler apparatus is moving or being moved along a surface containing an obstacle;
(b) the crawler apparatus is disposed on, is moving along, or being moved along a substantially non-flat surface;
(c) the crawler apparatus experiences motion or shock substantially normal to a surface on which the crawler apparatus is disposed, is moving, or is being moved; and
(d) the crawler apparatus is being transported by a conveyance that experiences motion or shock substantially normal to a surface on which the crawler apparatus is disposed, is moving, or is being moved.

In another embodiment, the invention provides an apparatus for moving a load, the apparatus comprising a platform and a plurality of crawlers. The platform is adapted for receiving a load thereon, the platform having a top side and a bottom side. The plurality of crawlers is removably coupled to the bottom side of the apparatus. Each crawler comprises a frame, a first end roller, a second end roller, and a belt. The frame has first and second ends. The first end roller is coupled to the frame and is disposed adjacent the first end of the frame, the first end roller comprising a first material. The second end roller is coupled to the frame and is disposed adjacent to the second end of the frame, the second end roller comprising a second material. The belt has an inner side capable of contacting each respective roller and an outer side capable of contacting the surface. The belt is disposed about at least a portion of the first end roller and at least a portion of the second end roller so as to have a slack limited enough to permit substantially continuous contact of the belt with at least a portion of the first and second rollers and to produce a respective inner band of contact between the inner side of the belt and each respective roller and to produce a respective outer band of contact between the outer side of the belt and the surface.

In a further embodiment, the invention provides an apparatus for moving a load along a surface, the apparatus comprising a support means, a rolling means, and a load distribution means. The support means is constructed and arranged for receiving a load to be moved. The rolling means is coupled to the support means and is constructed and arranged to permit movement of the support means. The load distribution means is constructed and arranged to cooperate with the support means and the rolling means to distribute, while producing substantially no damage to the surface on which the apparatus is disposed, is moving, or is being moved, a load created by at least one of the apparatus itself and a load received at the support means.

The load distribution means can be constructed and arranged to distribute, while producing substantially no damage to the surface on which the apparatus is disposed, is moving, or is being moved, a load created by at least one of the apparatus itself and a load received at the support means, when at least one of the following conditions exists:

(a) the apparatus is moving or being moved along a surface containing an obstacle;
(b) the apparatus is disposed on, is moving along, or being moved along a substantially non-flat surface;
(c) the apparatus experiences motion or shock normal to a surface on which the apparatus is disposed, is moving, or is being moved; and
(d) the apparatus is being transported by a conveyance that experiences motion or shock substantially normal to a surface on which the apparatus is disposed, is moving, or is being moved.

The apparatus can further comprise an adaptive load support means, the adaptive load support means constructed and arranged to be substantially inactive when the apparatus is disposed on, is moving along, or being moved along a substantially flat surface and is not experiencing motion or shock normal to the substantially flat surface, and wherein the adaptive load support means is further constructed and arranged to cooperate with the load distribution means to distribute, while producing substantially no damage to the surface on which the apparatus is disposed, is moving, or is being moved, a load created by at least one of the apparatus itself and a load received at the support means, when at least one of the following conditions exists:

(a) the apparatus is moving or being moved along a surface containing an obstacle;
(b) the apparatus is disposed on, is moving along, or being moved along a substantially non-flat surface;
(c) the apparatus experiences motion or shock normal to a surface on which the apparatus is disposed, is moving, or is being moved; and (d) the apparatus is being transported by a conveyance that experiences motion or shock substantially normal to a surface on which the apparatus is disposed, is moving, or is being moved.

Details relating to this and other embodiments of the invention are described more fully herein.

BRIEF DESCRIPTION OF THE DRAWINGS

The invention will be more fully understood from the following detailed description taken in conjunction with the accompanying drawings, in which:

FIG. 3 is an isometric of the roller and belt portion of the embodiment of FIG. 1, shown with frame removed;

The Figures are not to scale, emphasis instead being placed on illustrating the principles of the invention. In addition, in the Figures, like reference numbers refer to like elements.

DETAILED DESCRIPTION OF THE INVENTION

Figure 1:
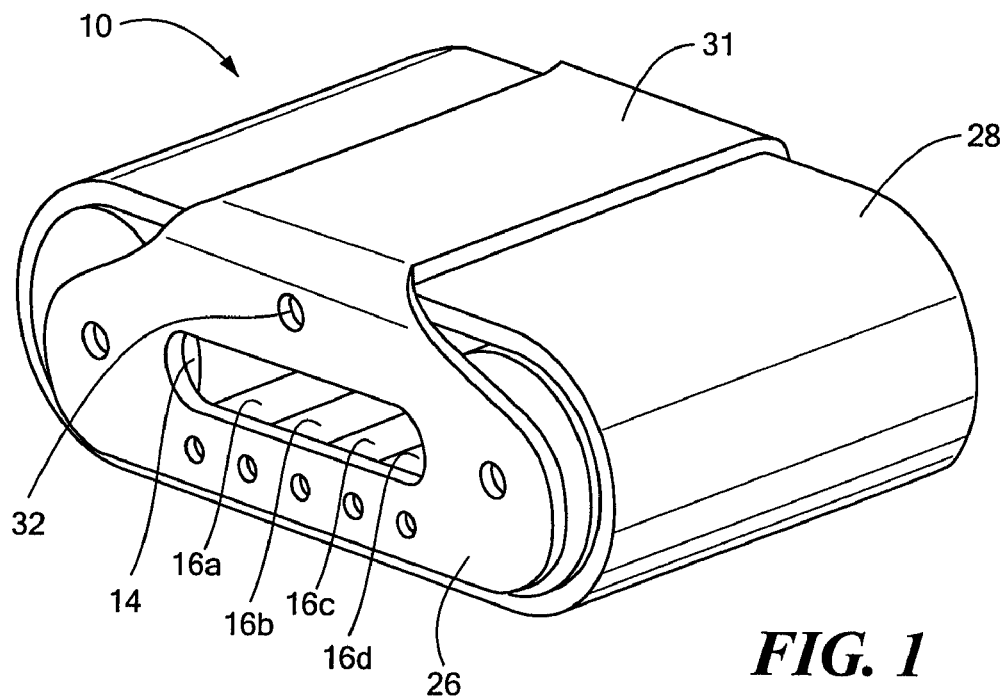
FIG. 1 is an isometric view of a first embodiment of the invention.
Figure 2:
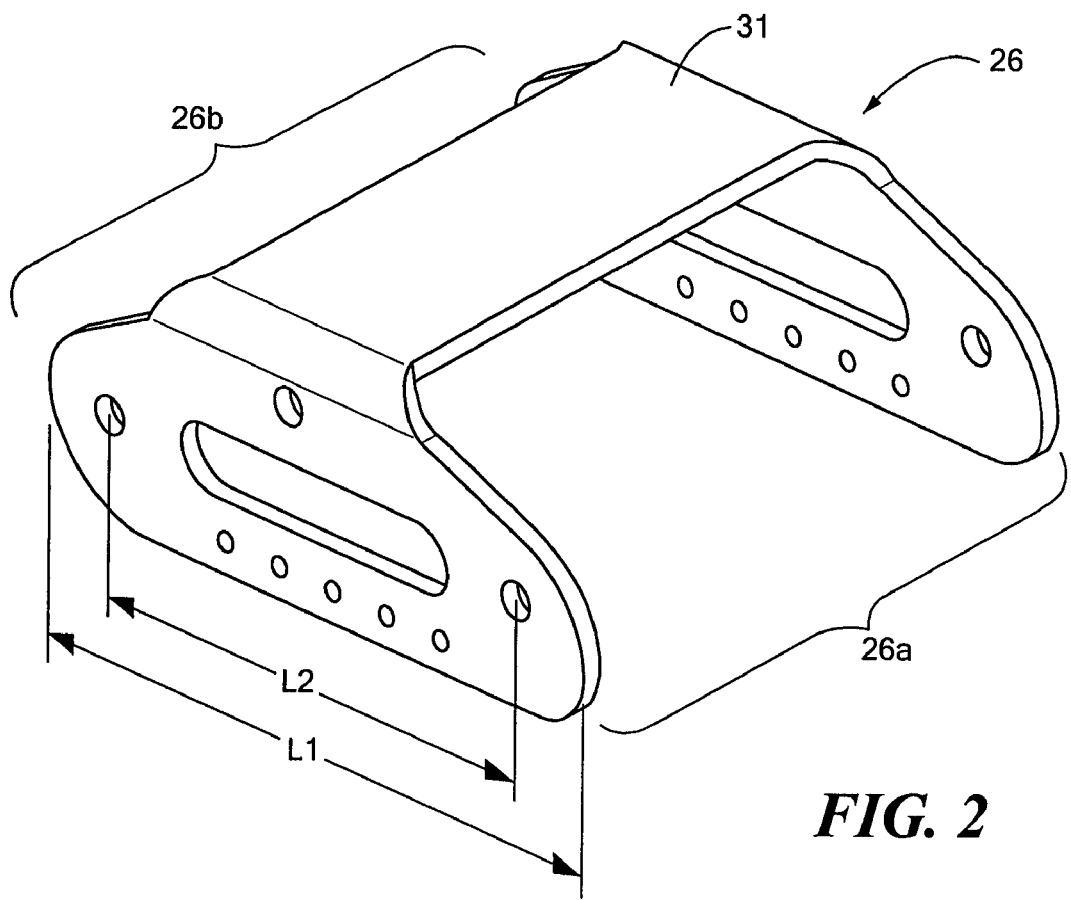
FIG. 2 is an isometric view of the frame portion of the embodiment of FIG. 1.

FIG. 1 is an isometric view of a crawler apparatus 10 in accordance with a first embodiment of the invention, FIG. 2 is an isometric view of the frame 26 portion of the embodiment of FIG. 1, and FIG. 3 is an isometric of the roller and belt portion of the embodiment of FIG. 1, shown with frame 26 removed. Referring to FIGS. 1-3, the crawler apparatus includes a first end roller 12, a second end roller 14, and a plurality of intermediate rollers 16a, 16b, 16c, 16d, 16e (roller 16e is not visible in FIG. 1 but is visible in other views, e.g., FIG. 3), all coupled to a frame 26. The first end roller 12 is disposed proximate a first end 26a of a frame 26, and the second end roller 14 is proximate a second end 26b of the frame 26 and is generally parallel with the first end roller 12. Both the first end roller 12 and second end roller 14 are positioned within the frame 26 such that a portion of each end roller 12, 14 extends below the bottom surface of the frame 26. This helps to ensure that the frame 26 is not contacting a surface over which the crawler apparatus 10 is traveling.

While a total of five intermediate rollers 16a, 16b, 16c, 16d, 16e are shown and described, it should be understood that any number of intermediate rollers 16 could be used and, in at least one embodiment, the crawler apparatus 10 can be constructed without any intermediate roller 16. The intermediate rollers 16 are disposed within the frame 26 such that a portion of each intermediate roller extends below the bottom surface of the frame 26. The intermediate rollers are generally parallel with the end rollers 12 and 14, and are disposed within frame 26 between the first end roller 12 and the second end roller 14.

Each roller 12, 14, 16 has a central shaft about which the respective roller rotates. For example, the first end roller 12 has a central shaft 22, second end roller 14 has a central shaft 20, and each respective, intermediate roller 16 has a respective central shaft 18, etc. Each roller 12, 14, 16 may further include one or more bearings to facilitate rotation of the respective roller about the roller's shaft, as will be understood by those of skill in the art.

There is at least a minimal spacing between each intermediate roller 16, and between the intermediate roller 16 and a respective end roller 12, 14. The minimal spacing is small enough to ensure free movement of each roller 12, 14, 16, to help reduce friction, and also to help minimize potential "jams" between rollers that might arise from a buildup of dirt, dust, etc. Thus, it is advantageous to avoid any small line of contact between any two adjacent rollers on the crawler apparatus 10.

The rollers 12, 14, 16 can be made using any material strong enough to help distribute a load coupled to the frame 26 yet light enough to help the crawler apparatus to be movable with the load mounted thereon. For example, in one embodiment, for moving loads of up to 6000 pounds (and for static carrying of loads of around 5-25 tons), the rollers 12, 14, 16 are fabricated using extruded aluminum alloy stock tubing having a wall thickness of about 0.25 inches thick, such as the material specified by Society of Automotive Engineers (SAL) (Aerospace Materials Standards) AMS-QQ-A-200/8 or American Society of Testing and Materials (ASTM). This example of material and dimensions is illustrative and not limiting. The rollers 12, 14, 16 can have virtually any size, and, although the end rollers 12, 14 are illustrated as having a larger diameter than the intermediate rollers 16, the invention is not so limited. In one illustrative embodiment, the end rollers 12, 14 each have an outer diameter of about 6" and the intermediate rollers have a diameter of about 2". In another embodiment, the diameter of the end rollers 12, 14 can range anywhere from two (2) to one hundred (100) times the thickness of the belt 28.

The crawler apparatus 10 further includes a belt 28, disposed about at least a portion of the first end roller 12, second end roller 14 and intermediate rollers 16. The belt 28 has an inner side 28a capable of contacting at least a portion of each of the first end roller 12, second end roller 14 and intermediate rollers 16, and an outer side 28b capable of contacing a surface over which the crawler apparatus travels or onto which the crawler apparatus is disposed. The belt 28 is disposed so that it has limited slack and such that its inner side 28a is under substantially continuous contact with at least a portion of the first end roller 12, second end roller 14 and intermediate rollers 16. For example, the belt 28 can be under tension.

The belt 28 cooperates with the first end roller 12, second end roller 14, and intermediate rollers 16 to help the crawler apparatus 10 to move and also to help distribute the weight of a load coupled to the crawler apparatus 10. In particular, the contact between the belt 28 and the first end roller 12, second end roller 14 and intermediate rollers 16 produces a respective inner band of contact between the inner side 28a of the belt 28 and each respective roller and a respective outer band of contact between the outer side 28b of the belt and a surface (e.g., a substantially planar surface). These bands of contact are explained further below.

Advantageously, the belt 28 is made from a material selected to help ensure that the contact pressure along the band of contact between any given roller and the belt 28 does not cause undesired permanent or temporary damage to a surface that the crawler apparatus 10 is moving or rolling over and/or is disposed statically upon (i.e., rests upon). Examples of undesired damage include, but are not limited to, deformation, cracking, tearing, scratching, denting, pitting, scuffing, and any condition exceeding a predetermined level of contact pressure. Materials that can help to reduce undesired damage include, for example, materials that help to ensure that a band of contact is formed, such as materials capable of recovering their shape after being deformed and/or after a deforming force (such as a load) are applied to them. Materials that can help to reduce undesired damage further include, for example, materials having a hardness less than the hardness over which the crawler apparatus is disposed, is to be moved, or is being moved, and those of skill in the art will appreciate that the material may vary depending on the surface.

For many types of rigid and/or substantially rigid surfaces, materials for the belt 28 that provide the above contact pressure and damage reducing advantages include elastomeric materials, including but not limited to at least one of nylon; TEFLON; polyethylene; natural rubber; synthetic rubber; neoprene; chloroprene; urethane; polyurethane rubber; butyl rubber nitrile rubber; ethylene propylene diene monomer (EPDM) rubber; nitrile-butadiene rubber; styrene-butadiene rubber; silicone room temperature vulcanizing (RTV) rubber; fluorosilicone rubber; poly(styrene-butadiene) rubber (SBR); polychloroprene (CR); ethylene-propylene rubber (EPR); and thermoplastic elastomer (TPE). For example, in one embodiment, the belt 28 is constructed using a reinforced polymer, such as a neoprene belt having integral molded poly-cloth and longitudinal KEVLAR yarn reinforcement. This embodiment includes an inner layer of 0.05" of NEOPRENE, two layers of abut 0.036" thick polyester fabric, a center layer of about 0.048" thick of helix wound KEVLAR yarn, having a durometer of 77-90 SHORE A, and an overlay of about 0.3" thick NEOPRENE, resulting in a belt 28 having a wall thickness (between inner side 28a and outer side 28b) of about 0.4" thick. A belt meeting these requirements is available as part number RT1 from Carlisle Power Transmission Products, Inc., of Springfield, Mo.

Figure 5:
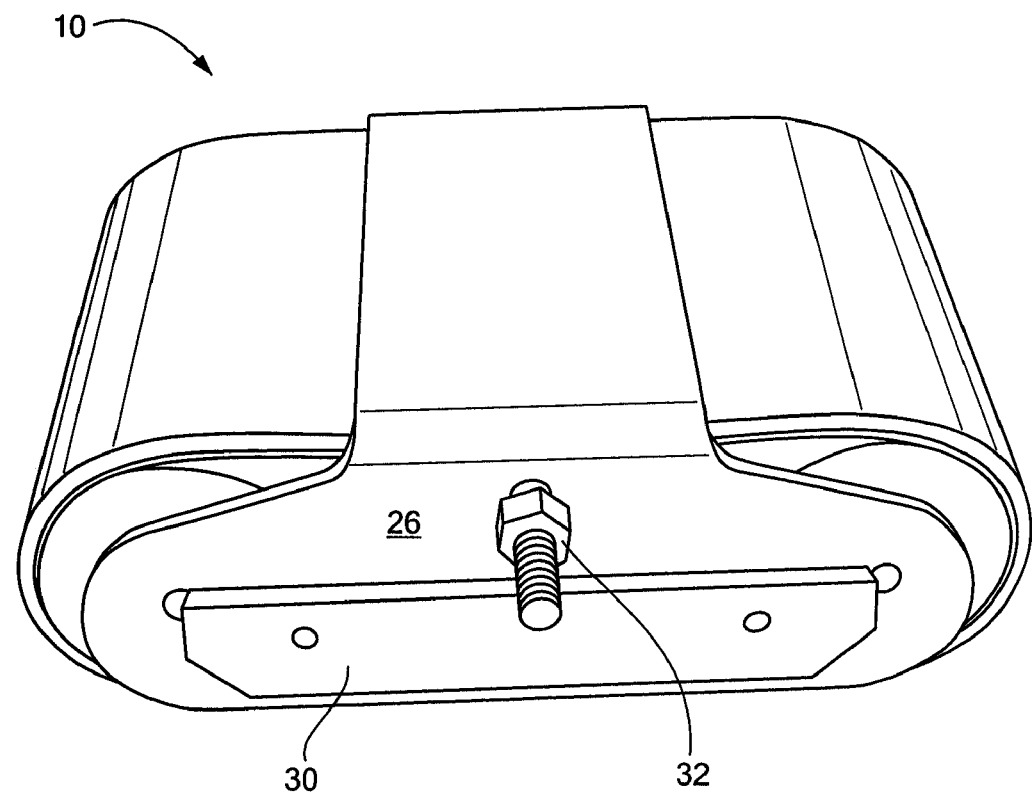
FIG. 5 is an isometric view of the embodiment of FIG. 1, further including a side plate.

The shape and design of the frame 26 shown in FIGS. 1-3 is not limiting, and those of skill in the art will appreciate that the exact appearance of the frame 26 can vary greatly. In one example embodiment, the frame 26 has an overall length L1, from first end 26a to second end 26b, of about eighteen (18) inches. This corresponds to an approximate contact area of the belt 28 and rollers 12, 14, 16 having a length L2 of about thirteen (13) inches. The frame 26 can have virtually any appearance as long as it is capable of having the rollers 12, 14, 16 be coupled thereto, such as by shafts and bearings (e.g., central shaft 20 for second end roller 14, central shaft 22 for first end roller 12, and central shafts 18a through 18e for intermediate rollers 16a through 16e, respectively) or by any other method or means known to those of skill in the art. In addition, the frame 26 can include load receiving surface 31, to which a load, such as a pallet or portion therof, can be coupled, and a side plate 30, as shown in FIG. 5, to help reduce the amount of dirt, dust, moisture, etc. that can get into the rollers 12, 14, 16 and/or the inner side 28a of the belt 28. The side plate 30 also helps to protect the ends of the rollers 12, 14, 16.

The frame 26 can be fabricated using any material (e.g., aluminum, steel, titanium, carbon fibers, composites, capable of having rollers mounted thereto and having sufficient strength to help distribute a load coupled thereto. It is preferable that the material has a good strength to weight ratio, to help ensure that the crawler apparatus 10 is as light as possible while still being able to transport and/or hold heavy loads (of course, the material selected for the frame 26 is at least partially dependent on the expected weight of the load and will thus vary). In one illustrative embodiment, the frame 26 is fabricated using 0.375" thick aluminum stock, such as SAE AMS-QQ-A-250/11 or ASTM B209.

Figure 4A:
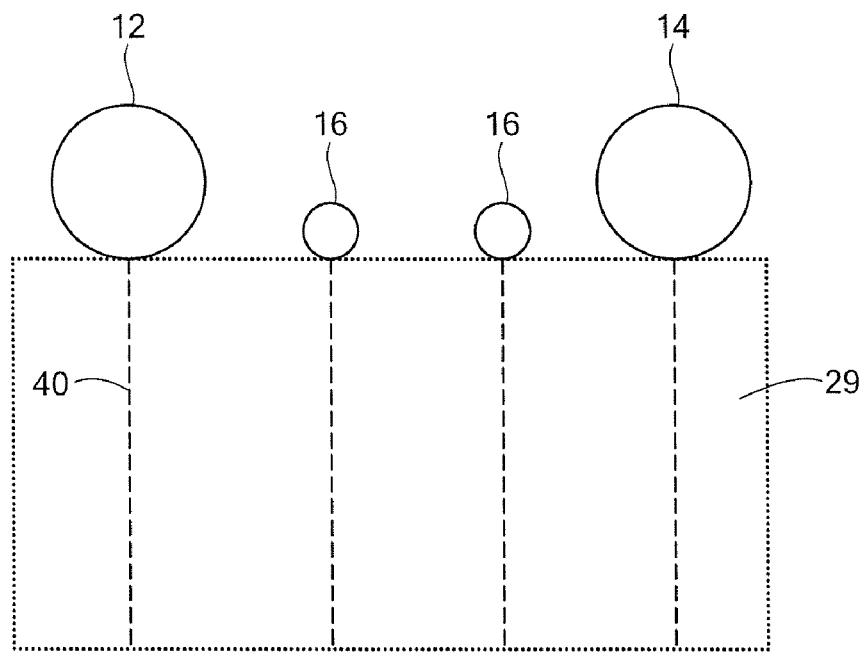
FIGS. 4A and 4B are cross-sectional diagrams contrasting the difference between points of contact as shown in FIG. 4A and bands of contact as shown in FIG. 4B.
Figure 4B:
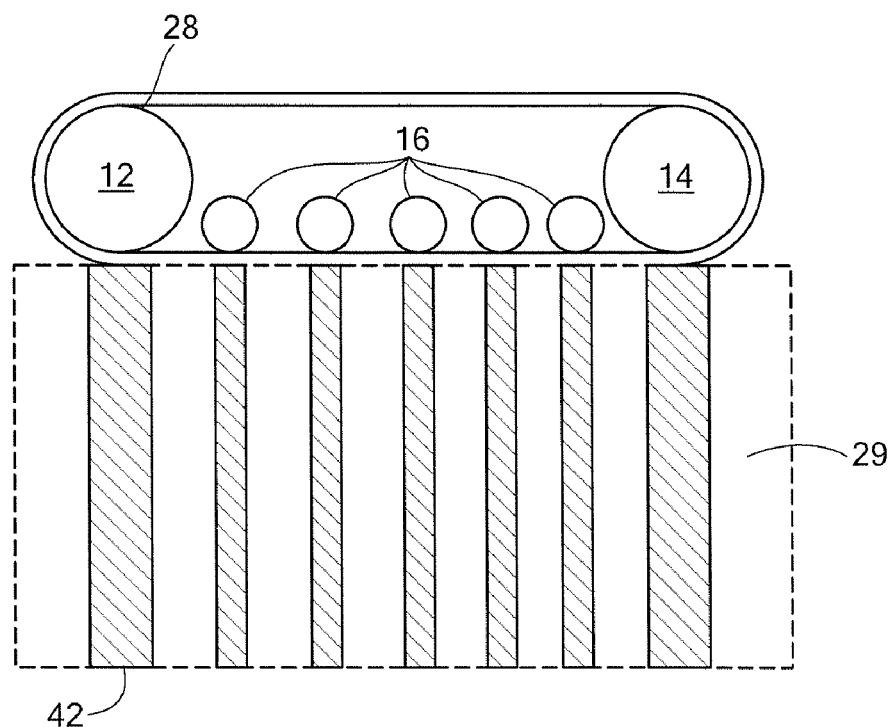

As noted above, the belt 28 and rollers 12, 14, 16 cooperate to produce bands of contact, which provide improved load bearing and damage reducing advantages as compared to rollers having lines of contact. Referring briefly to FIGS. 4A-4B, FIG. 4A is a cross-sectional diagram showing an example of prior art lines 40 of contact and, FIG. 4B is a cross-sectional diagram showing bands 42 of contact for one embodiment of the invention. In each of FIGS. 4A-4B the cross-sectional view through the rollers is disposed adjacent to a view what the contact area would look like underneath each respective roller, on a substantially planar surface 29, where the contact area being shown corresponds to the contact area that runs the length of the roller.

FIG. 4A shows a prior art setup having a first end roller 12, a plurality of intermediate rollers 16, and a second end roller 14, but no belt and no resilient or flexible coating or layer on any of the rollers. The rollers 12, 14, 16 of FIG. 4A are substantially cylindrical in shape. As those of skill in the art know, contact between a curved surface, such as a cylinder, and a substantially planar surface produces some level of deformation in both surfaces as well as a line of contact between the curve and the plane. Generally, the harder of the two surfaces will experience lesser deformation. Surfaces of relatively similar hardness may experience similar (if any) deformation. Thus, for the example of a steel or aluminum roller, such as is illustrated in FIG. 4A, traveling over a planar surface of similar hardness, the deformation will be minor, and thus the line of contact 40 will be relatively thin. The line of contact 40 of FIG. 4A corresponds to a very small surface area of contact, and high stresses (along the line of contact) may be experienced even with relatively light loads applied to the roller. Thus, if a load is coupled (e.g., via a frame) to the rollers 12, 14, 16 of FIG. 4A, significant contact pressure/stress may occur along the line of contact. This contact pressure/stress can deform the surface in such a way as to cause permanent damage, whether immediately or over time. The contact pressure/stress can also interfere with effective operation of the rollers.

In contrast, as shown in FIG. 4B, the combination of the belt 28 and the rollers 12, 14, 16, produces a plurality of bands 42 of contact, where each band 42 has a greater surface area than a line 40 of contact, and thus represents a larger contact area with the surface 29. The size of the band 42 is dependent on a number of factors, including the size of the roller 12, 14, 16, the material from which the roller 12, 14, 16 is made (rollers made of elastic material may deform more under load than rollers made of rigid material), the material from which the belt 28 is made, the thickness of the belt 28, and the flexibility/resilience of the belt 28. The overall amount of contact that the crawler apparatus 10 produces further depends on the number and spacing of the rollers 12, 14, 16. Generally, it is preferred that the rollers be closely spaced, to increase the overall contact area.

In one example embodiment, a crawler apparatus 10 with seven (7) rollers (including a first end roller 12, second end roller 14, and five intermediate rollers 16) was tested. The first end roller 12 and second end roller 14 each had a diameter of about five (5) inches, and each intermediate roller 16 had a diameter of about one and a half (1.5) inches. The belt 28 had a thickness of about half inch (0.5) of an inch and a width of about ten (10) inches. The first and second end rollers 12, 14 together produced a total contact area of about thirty five to forty (35-40) square inches when the crawler apparatus 10 was loaded with three thousand (3000) pounds. The five intermediate rollers 16 together produced a total contact area of about forty to forty-five (40-45) square inches. The total contact area produced by all rollers averaged about eighty (80) square inches at three thousand (3000) pounds load, resulting in a localized contact pressure under the rollers of about 37.5 pounds per square inch (PSI)—less than the pressure of a typical truck tire (40 PSI). In this tested example, the crawler apparatus 10 itself had an overall footprint of about 130 square inches. At 3000 pounds load, the overall average crawler footprint pressure was about 23 PSI, less than that of a typical automobile tire (25-35 PSI). These pressures of 20-40 PSI generally do not damage surfaces like aircraft treadways.

Further testing of this example embodiment, using ten times rated load (i.e., 30,000 pounds load), with the same crawler apparatus described above (i.e., five inch rollers, 80 square inch net contact area at load, etc.) showed a contact pressures of between 400-450 PSI (436 PSI) average. In contrast, a shoe heel applied by a heavy individual can achieve a contact pressure of 500-2000 PSI. Thus, a crawler apparatus 10, constructed in accordance with at least some embodiments of the invention, should not overload surfaces like aircraft treadways at any local contact surface.

Figure 6A:
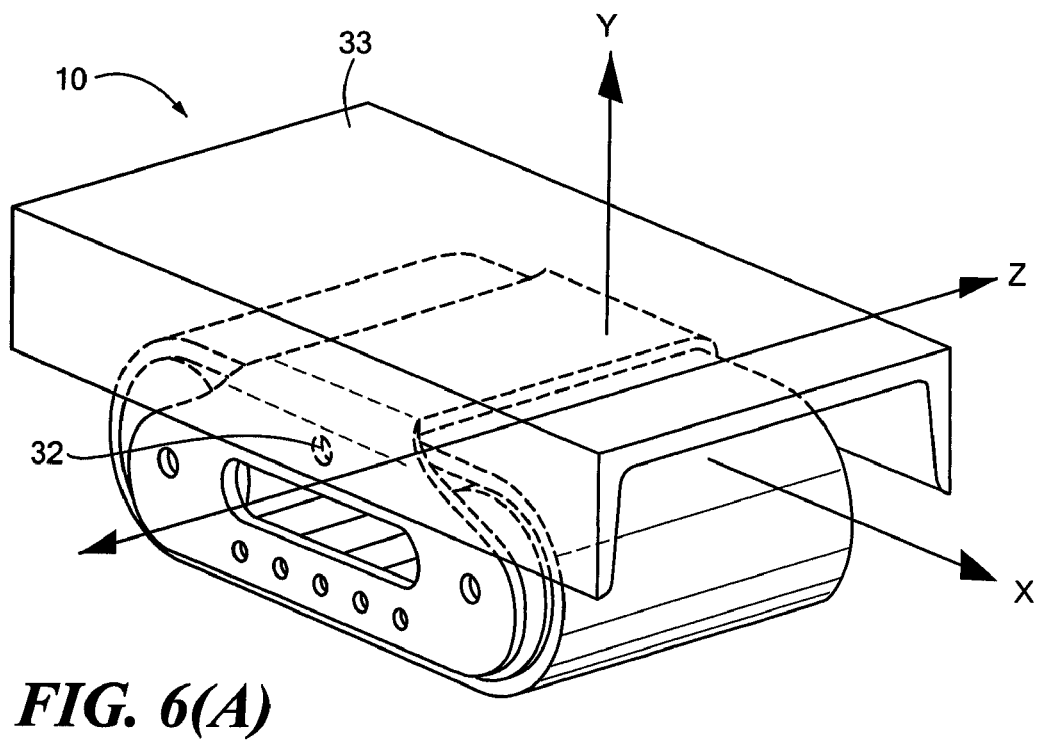
FIG. 6A is an isometric view of the embodiment of FIG. 1, showing an attached first pivot mechanism.
Figure 6B:
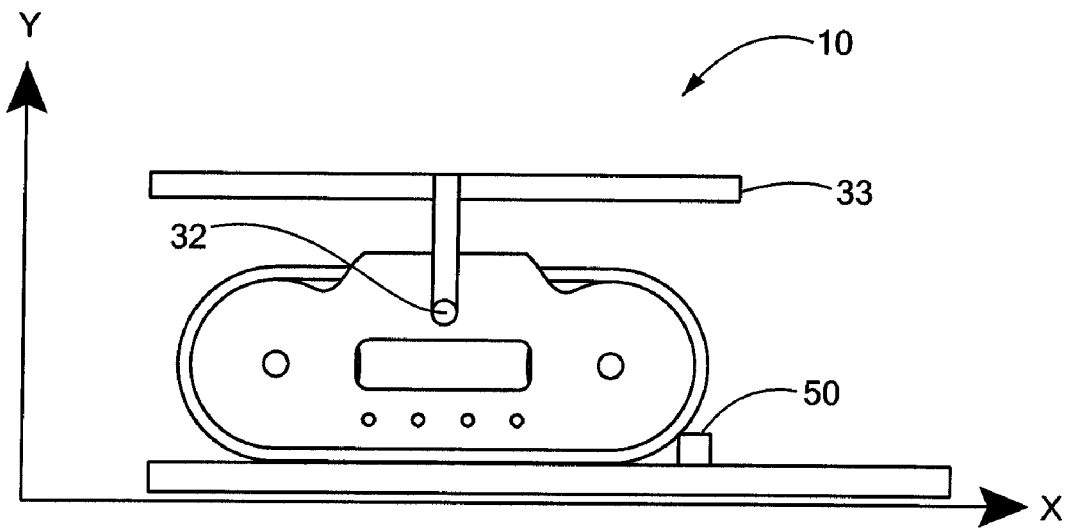
FIG. 6B is a cross-sectional view of the pivot mechanism of FIG. 6A, as viewed along the X-Y axes, showing the first embodiment with attached first pivot mechanism before traversing an object.
Figure 6C:
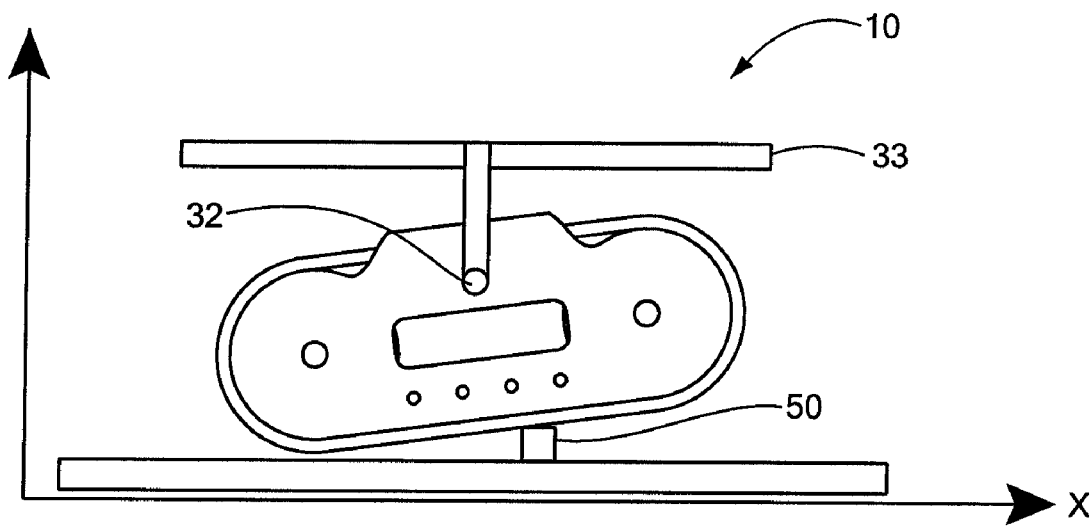
FIG. 6C is a cross-sectional view of the pivot mechanism of FIG. 6A, as viewed along the X-Y axes, showing the first embodiment with attached first pivot mechanism as it traverses an object.

The frame 26 can further include a first pivot axis 32 that permits the crawler apparatus 10 to be moved along a path having a change in slope and/or to traverse over an object. For example, FIG. 6A is an isometric view of the embodiment of FIG. 1, showing an attached first adapter plate 33 coupled to a first pivot axis 32. The adapter plate 33 and first pivot axis 32 can be coupled together by any means known to those of skill in the art, such as a hinge. A load (not shown) can be coupled to the adapter plate 33. FIG. 6B is a cross-sectional view of the pivot mechanism of FIG. 6A, as viewed along the X-Y axes, showing the first embodiment with attached first pivot mechanism before traversing an object 50. FIG. 6C is a cross-sectional view of the pivot mechanism of FIG. 6A, as viewed along the X-Y axes, showing the crawler apparatus 10 with attached adapter plate 33 as it pivots along the first pivot axis 32 to traverse the object 50. As FIG. 6C illustrates, the first adapter plate 33 itself remains substantially level even when traversing the object 50. Note also that the movement of the crawler apparatus 10 would be similar if, instead of the object 50, the crawler apparatus 10 were traversing a slope. Testing has shown that the crawler apparatus 10 sustains only half its total weight on the single leading roller as it first rides up onto and over any object. Depending on the final overall length of the crawler apparatus 10, in one embodiment, the pitching or ride up angle is only a few degrees for objects up to one inch tall.

Figure 7A:
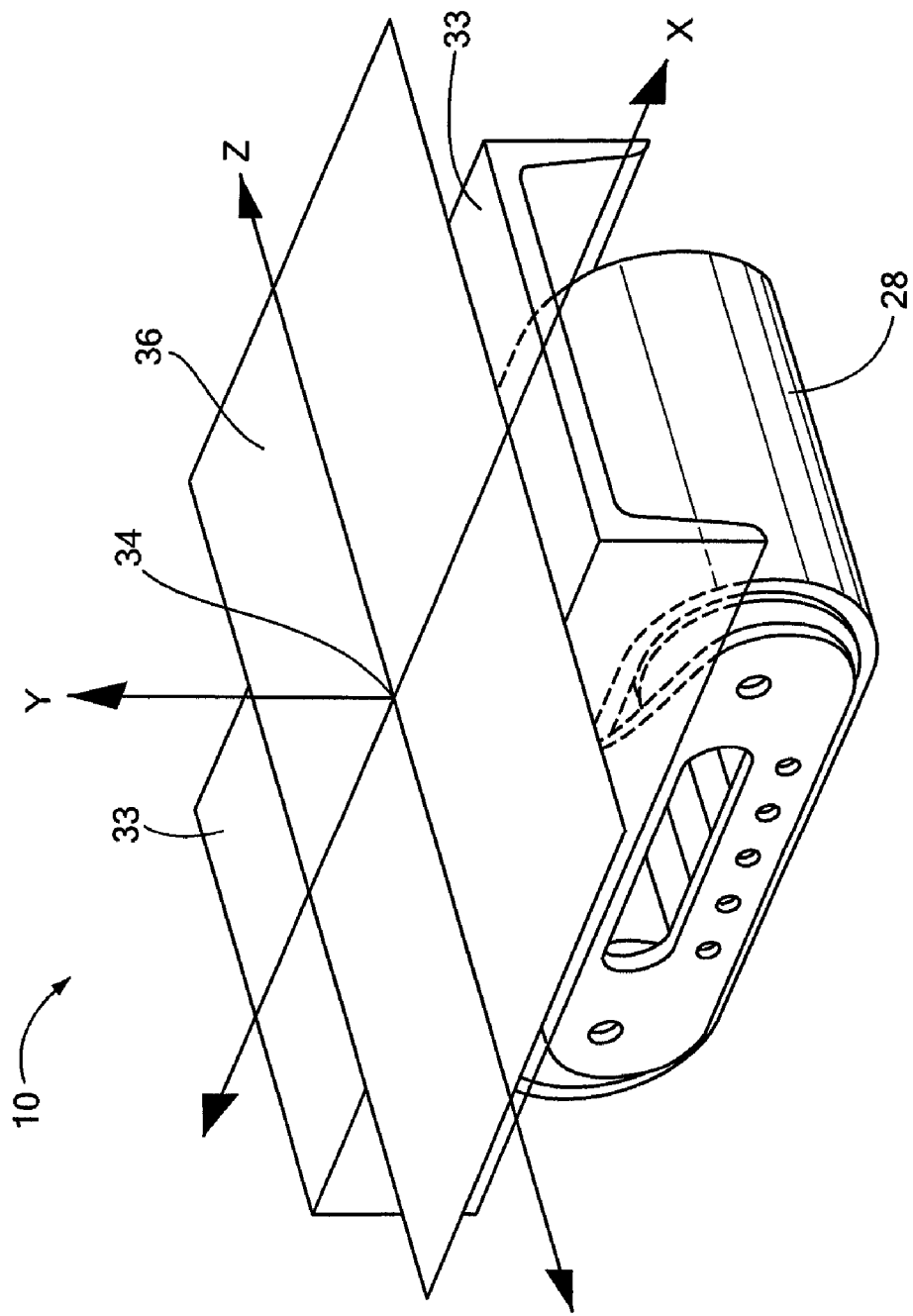
FIG. 7A is an isometric view of the embodiment of FIG. 1, showing an attached first pivot mechanism and an attached second pivot mechanism.
Figure 7B:
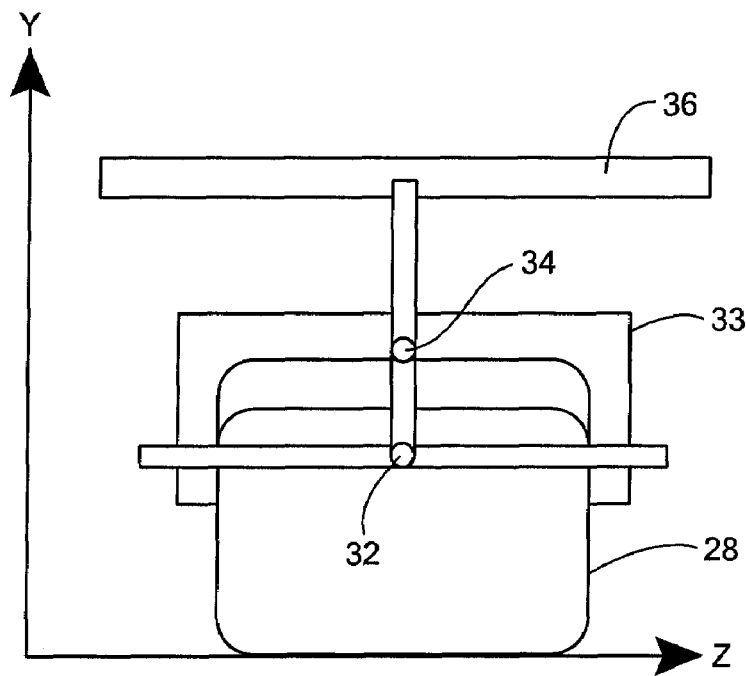
FIG. 7B is a cross-sectional view of the pivot mechanism of FIG. 7A, as viewed along the Y-Z axes, showing the first embodiment with attached first pivot mechanism and attached second pivot mechanism, before traversing an object.
Figure 7C:
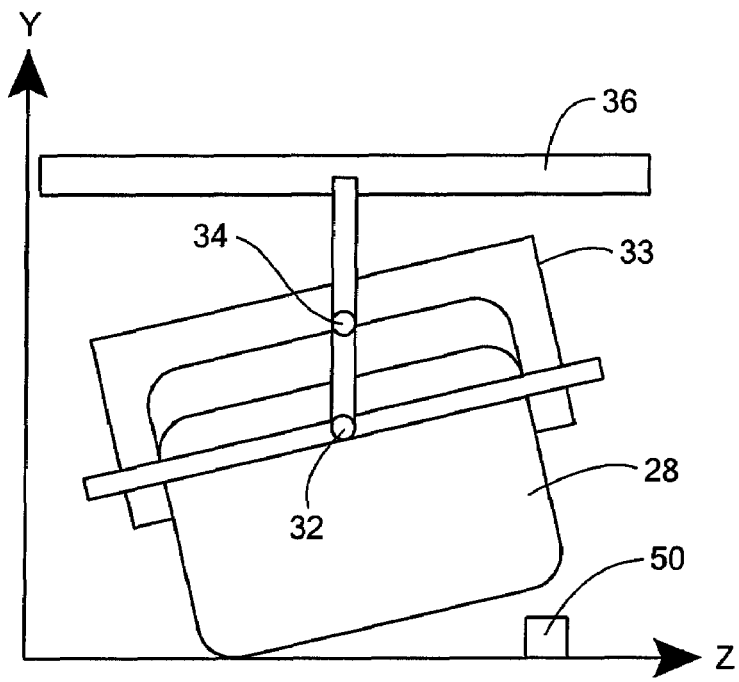
FIG. 7C is a cross-sectional view of the pivot mechanism of FIG. 7A, as viewed along the Y-Z axes, showing the first embodiment with attached first pivot mechanism and attached second pivot mechanism, as it traverses an object.

The frame 26 also can include a second pivot axis 34 that permits the crawler apparatus 10 to be moved along a path having at least one of a transverse and a longitudinal change in slope. For example, the first and second pivot axes 32, 34 can be implemented via gimbal or other known means for pivoting in more than one direction. FIG. 7A is an isometric view of the embodiment of FIG. 1, showing an attached first pivot mechanism (e.g., first adapter plate 33 coupled to the first pivot axis 32) and an attached second pivot mechanism (e.g., second adapter plate 36 coupled to second pivot axis 34). FIG. 7B is a cross-sectional view of the pivot mechanism of FIG. 7A, as viewed along the Y-Z axes, showing the crawler apparatus 10 with attached first pivot mechanism and attached second pivot mechanism, before traversing an object 50. FIG. 7C is a cross-sectional view of the pivot mechanism of FIG. 7A, as viewed along the Y-Z axes, showing the first embodiment with attached first pivot mechanism and attached second pivot mechanism, as it traverses an object 50.

FIGS. 8A-8B are first through fourth illustrations, respectively, showing a cross-sectional view of the first embodiment of the invention as it rolls over an obstacle.

Figure 8:
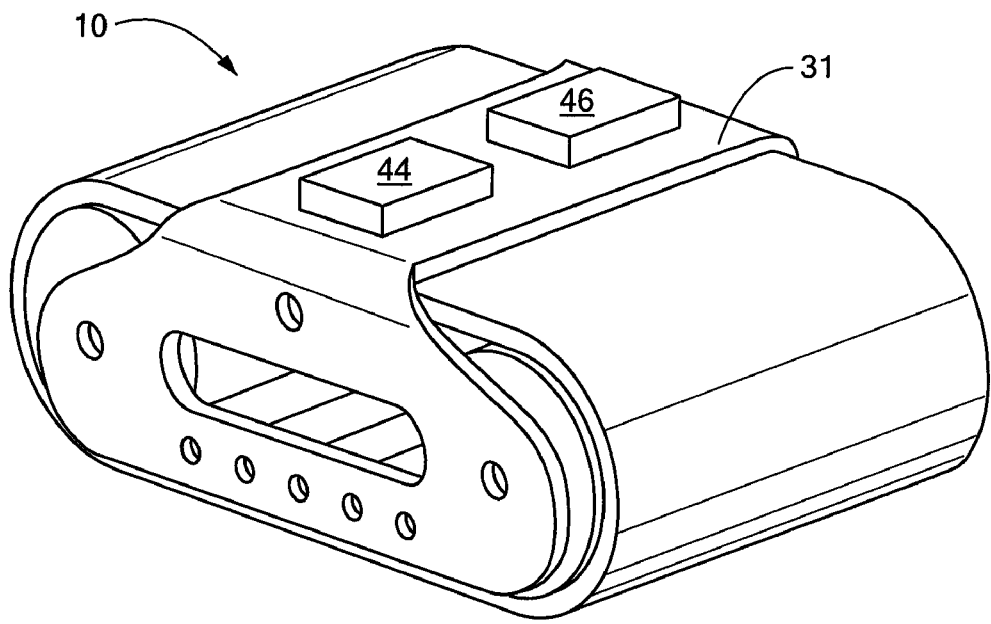
FIG. 8 is an isometric view of the embodiment of FIG. 1 that includes adapter pads.

The crawler apparatus 10 can be adapted to provide additional cushioning and/or shock absorption for a load mounted thereto. For example, FIG. 8 is an isometric view of the crawler apparatus 10 of FIG. 1 with first and second adapter pads 46, 44, respectively, mounted to the load receiving surface 31 of the frame 26. The first and second adapter pads 46, 44 can help to cushion a load when the crawler apparatus travels over irregular surfaces and help to provide some articulation in the X, Y, and/or Z directions. The adapter pads 46, 44 thus can serve as an alternative to either or both of the first and second pivot axes 32, 34. The pads 46, 44 can be made, for example, from an elastomeric, resilient or flexible foam material, such as any one or more of the previously listed materials usable for the belt 28.

Figure 9:
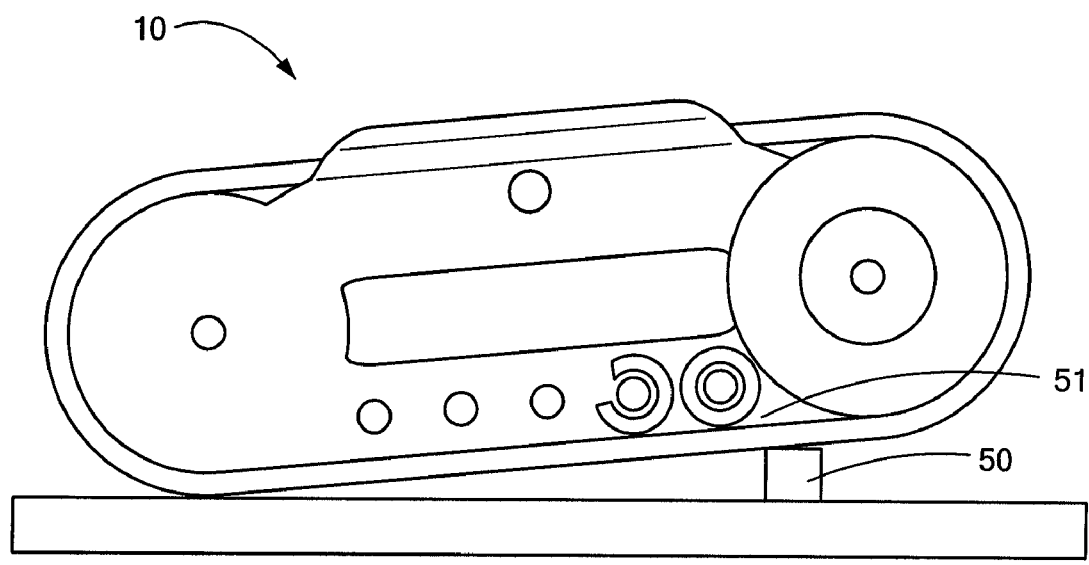
FIG. 9 is a cross sectional view of the embodiment of FIG. 1 showing a potential catch area that can be caused by an obstacle.
Figure 10:
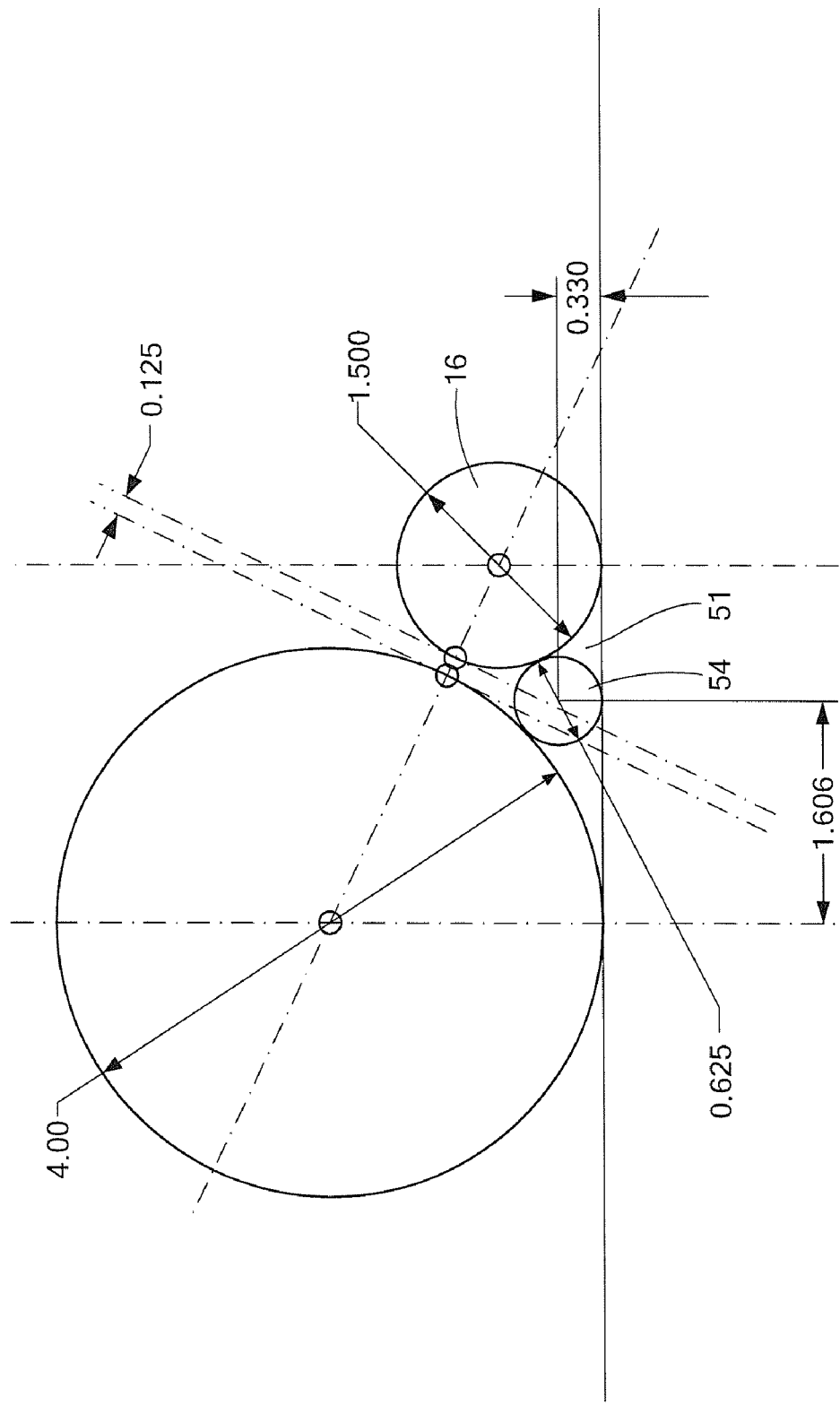
FIG. 10 is a diagram illustrating how the addition of an idler roller reduces the size of the catch area.
Figure 11A:
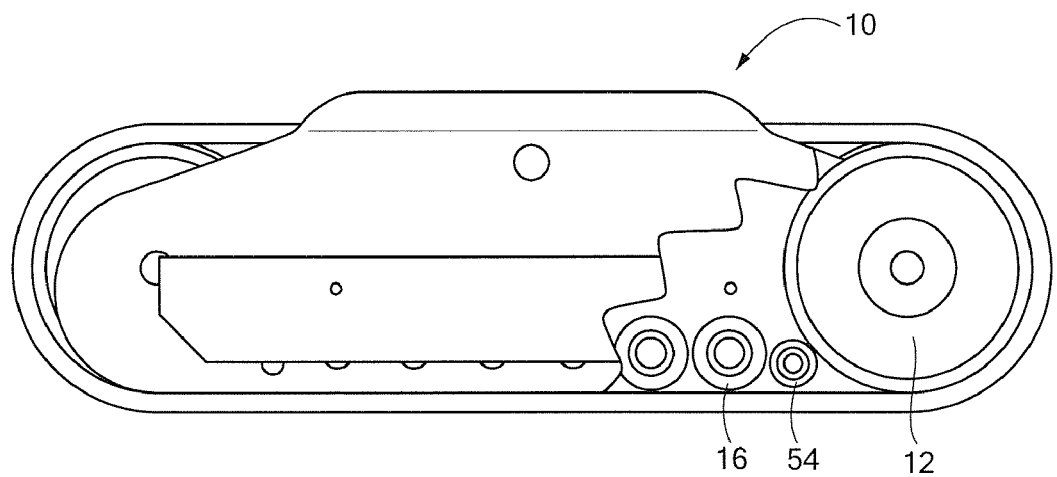
FIGS. 11A and 11B are cross sectional and isometric views, respectively, of a second embodiment of the invention.
Figure 11B:
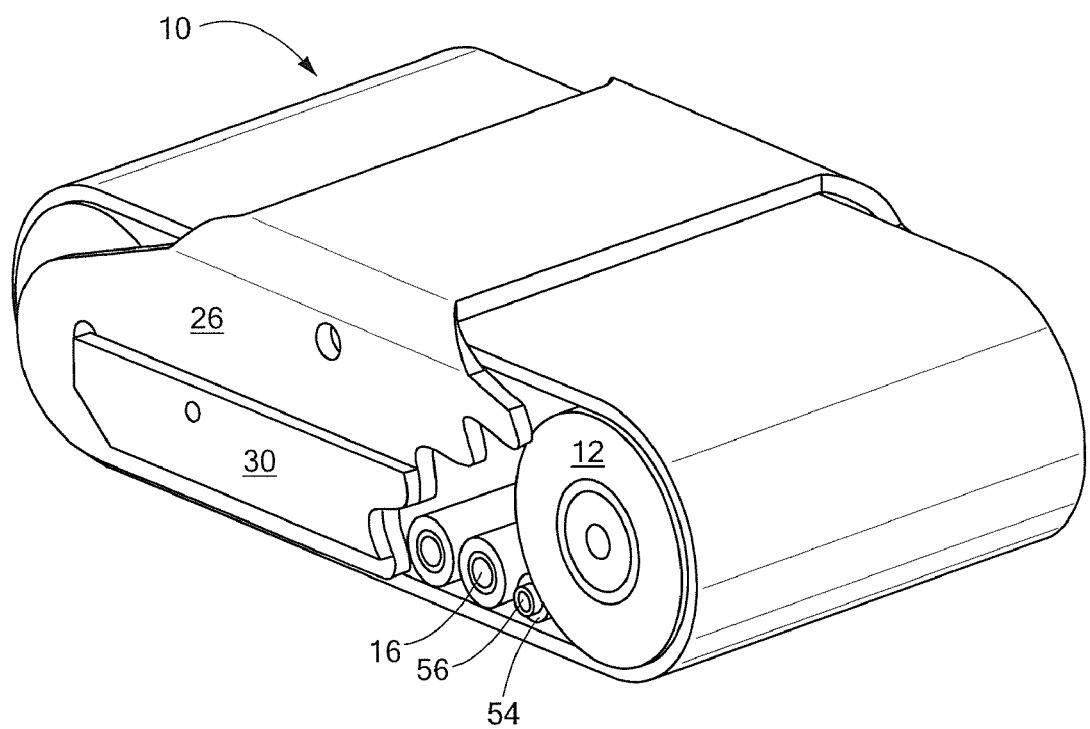

In a further embodiment, the invention provides a crawler apparatus 10 further modified to help compensate for the situation where an obstacle can catch on an area between rollers and/or lodge between rollers. Consider the example of FIG. 9, which is a cross sectional view of the crawler apparatus 10 of FIG. 1 showing a potential catch area 51 between first end roller 12 and intermediate roller 16 that can be caused by obstacle 50. In one embodiment, a solution is to provide a so-called idler roller 54 disposed in the catch area 51. For example, FIG. 10 is a diagram illustrating how the addition of an idler roller 54 reduces the size of the catch area 51 by filling in at least a portion of the catch area 51. FIGS. 11A and 11B are cross sectional and isometric views, respectively, of a second embodiment of the invention that includes an idler roller 54 mounted on a shaft 56, in the catch area 51 between the first end roller 12 and an intermediate roller 16.

Figure 12A:
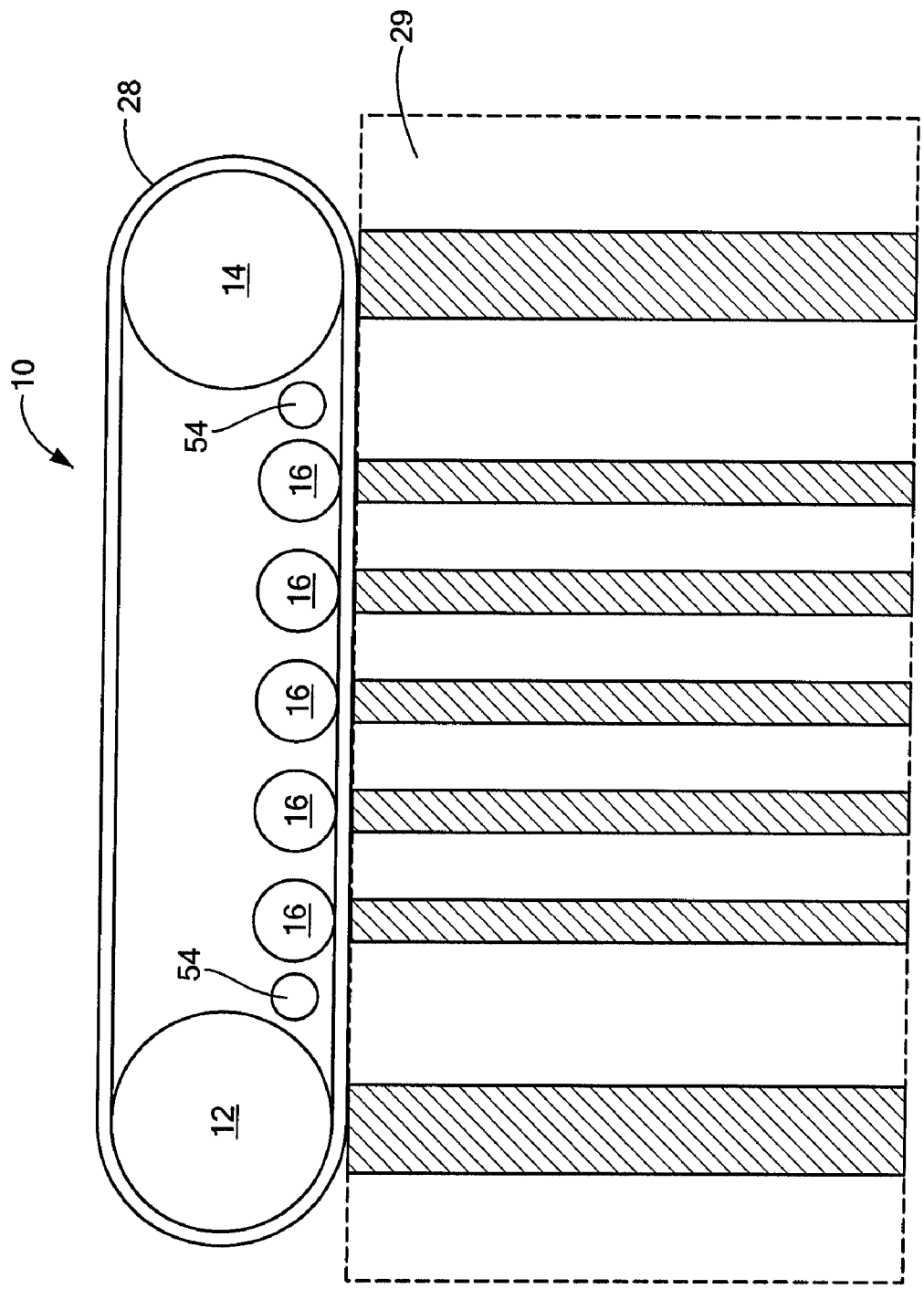
FIGS. 12A and 12B are cross-sectional diagrams showing bands of contact before and after the idler rollers are engaged, respectively.
Figure 12B:
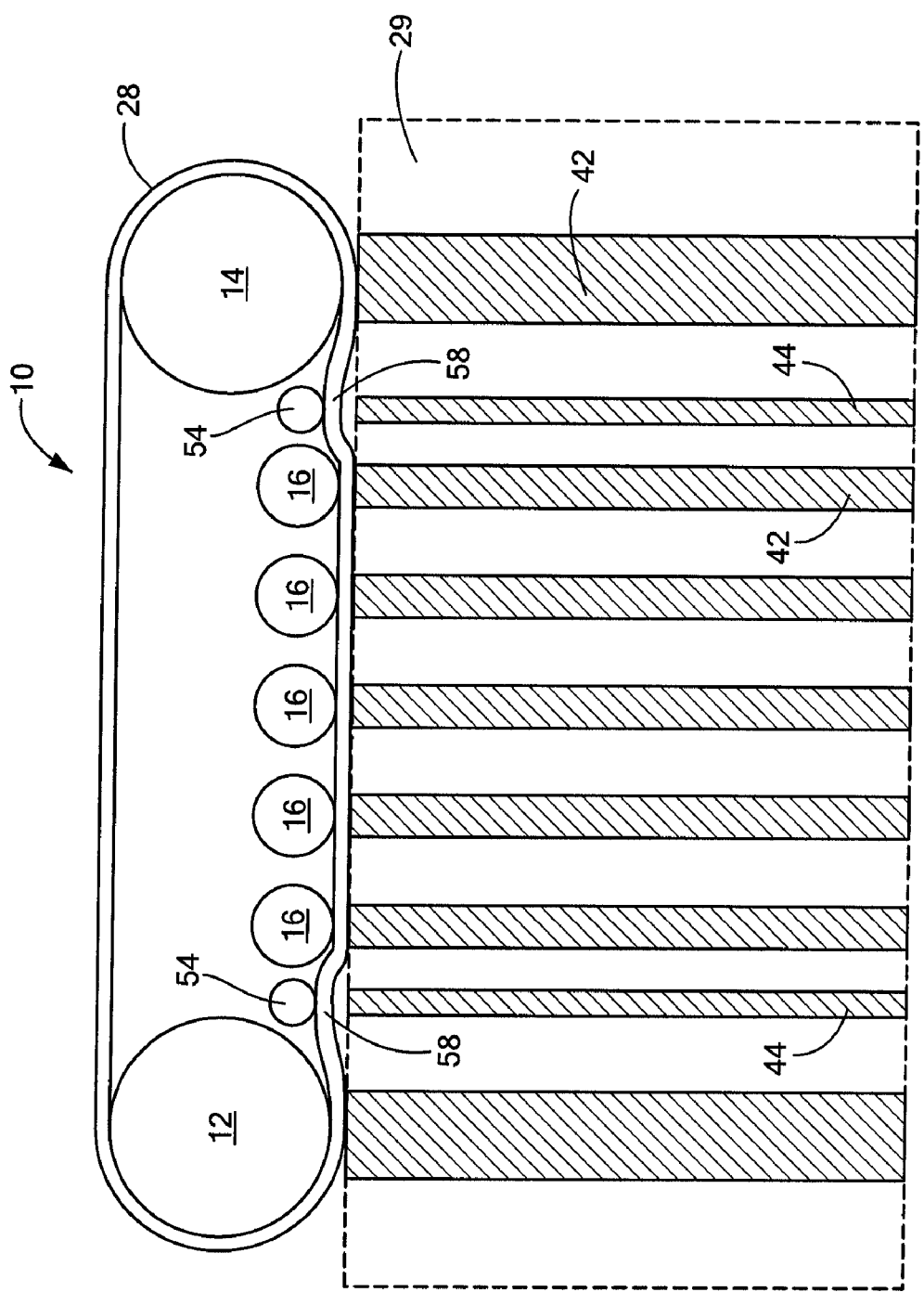
Figure 13:
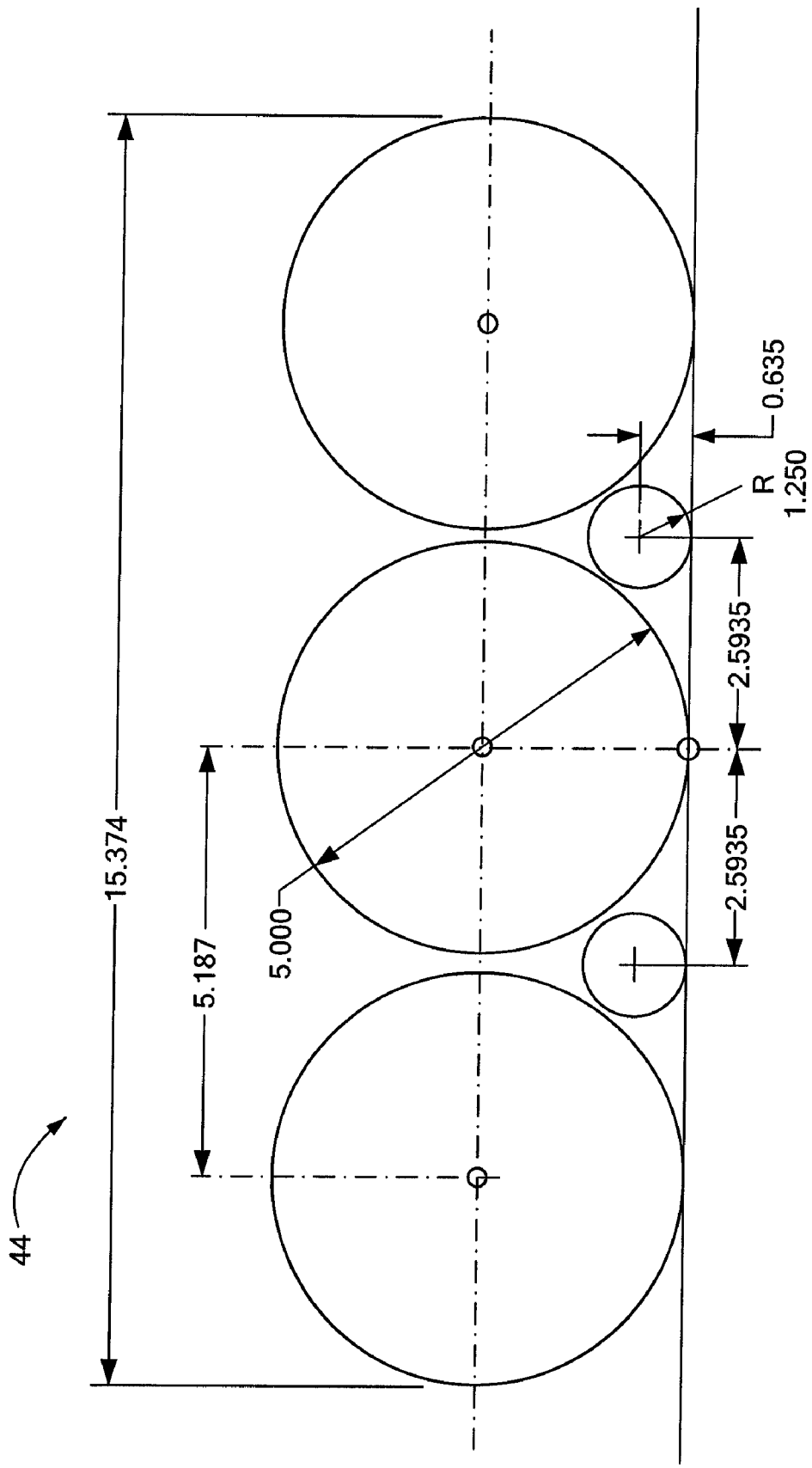
FIG. 13 is a diagram illustrating roller configuration for a third embodiment of the invention.
Figure 14A:
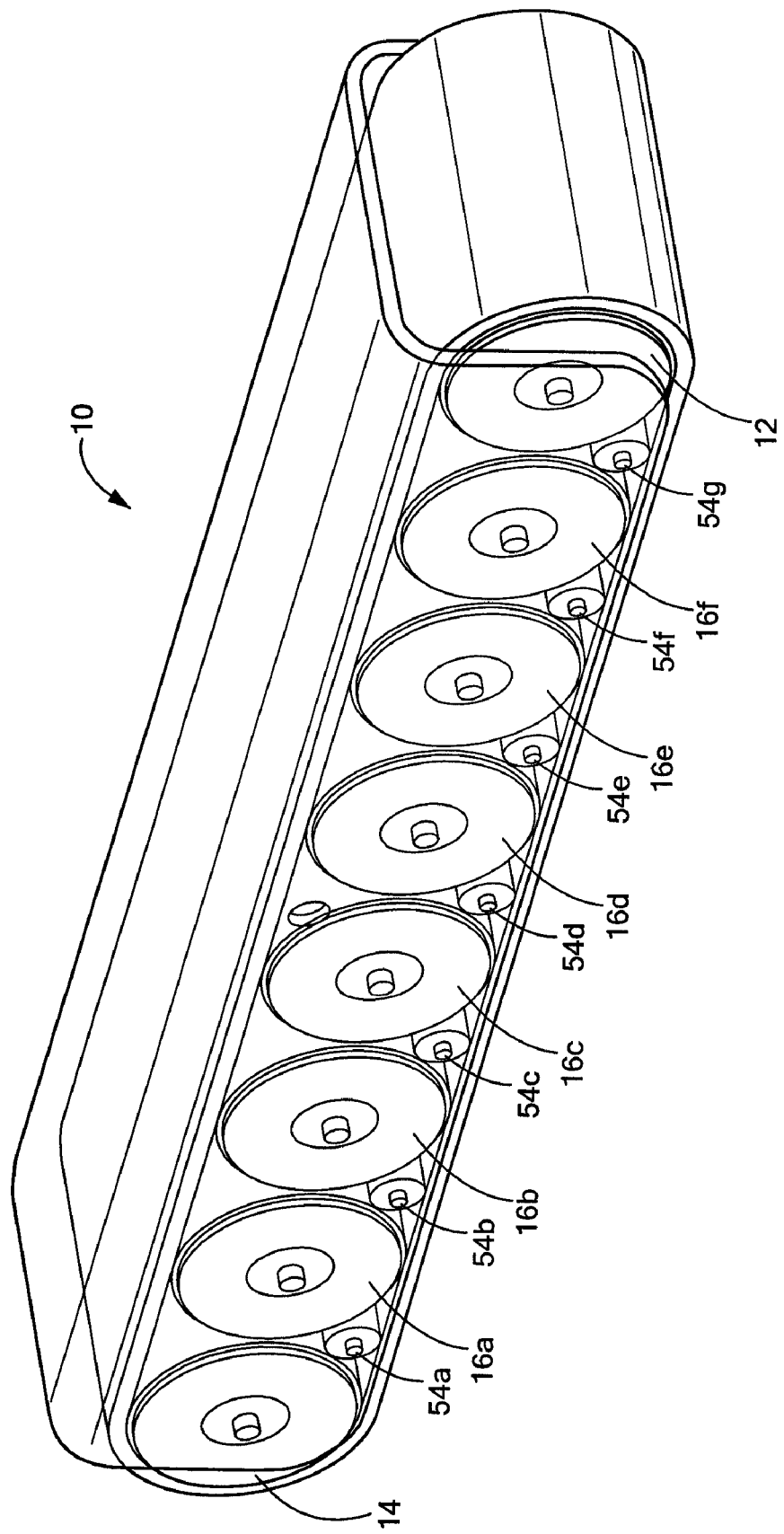
FIG. 14A is an isometric view of a third embodiment of the invention.
Figure 14B:
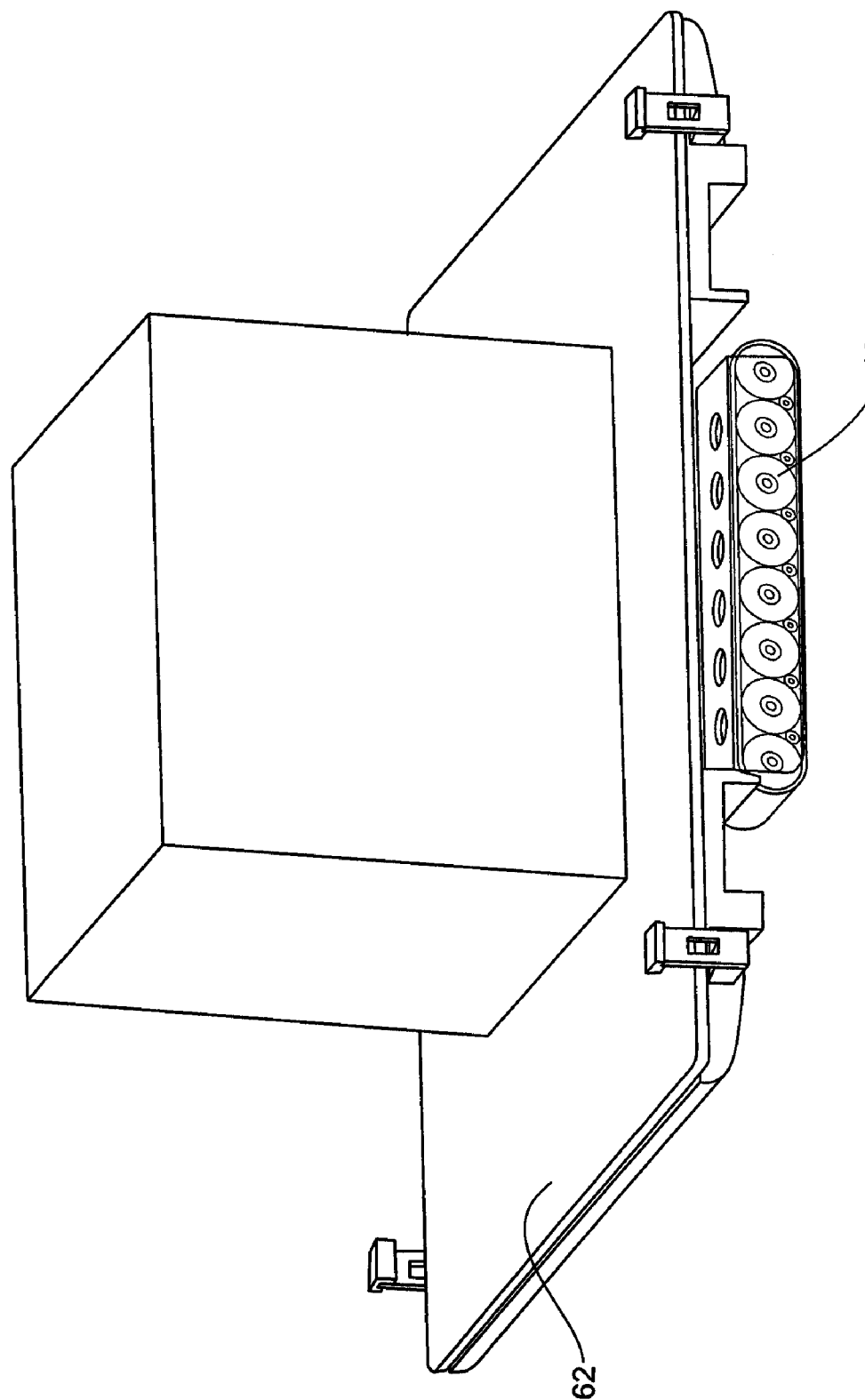
FIG. 14B is an illustrative example of a fourth embodiment of the invention, showing two crawlers coupled to a pallet carrying frame.

The idler roller 54 is coupled to the frame 26 such that there is a space (not visible in FIGS. 10 and 11) between the idler roller 54 and the belt 28. The idler roller 54 is normally free-wheeling and spaced apart from other rollers and the belt. When the crawler apparatus 10 is under a heavy enough load, however, the idler roller 54 will come into contact with the belt 28 and contribute to supporting the load. This is further illustrated in FIGS. 12A and 12B, which are cross-sectional diagrams showing bands of contact before and after the idler rollers 54 are engaged, respectively. As FIG. 12A illustrates, the idler roller 54 is, under some conditions, "idle", and does not contact either the belt 28 or the other rollers. Thus, there is no associated band of contact for the idler roller 54 in FIG. 12A. Under certain load conditions, however, as shown in FIG. 12B, the idler roller 54 contacts an area 58 of the belt, to produce a corresponding idler band of contact 44.

Various conditions can cause the idler roller 54 to contact the belt 28. For example, if the crawler apparatus 10 is being moved along or is moving along a substantially non-flat or irregular surface (such as a cracked surface, a pitted surface, a rough surface, etc.) and/or a surface containing an obstacle (e.g., as shown in FIG. 9), the belt 28 may deform slightly to conform to the obstacle. Rather than creating a catch area 51, the deformed portion of the belt 28 instead is the area 58 that contacts the idler roller 54. The idler roller 54 can then help to keep the crawler apparatus 10 moving and can also help to distribute a load coupled to the crawler apparatus 10 (at least while the idler roller 54 is in contact with the belt 28).

In describing the embodiments of the invention illustrated in the figures, specific terminology (e.g., language, phrases, product brands names, etc.) is used for the sake of clarity. These names are provided by way of example only and are not limiting. The invention is not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, layers, elements, etc. Such terminology used herein, however, is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention. In the Figures of this application, in some instances, a plurality of elements or blocks may be shown as illustrative of a particular element, or a single element or block may be shown as illustrative of a plurality of a particular element or block. It should be understood that showing a plurality of a particular element or block is not intended to imply that an article or manufacture or method implemented in accordance with the invention must comprise more than one of that element or block, nor is it intended by illustrating a single element or block that the invention is limited to embodiments having only a single one of that respective element or block. Those skilled in the art will recognize that the quantity of a particular element can be selected to accommodate the particular application or user needs. It will also be appreciated by those of ordinary skill in the art that unless otherwise indicated herein, the particular sequence of blocks in a given flow chart is illustrative only and can be varied without departing from the spirit and scope of the invention.

Having described and illustrated the principles of the technology with reference to specific implementations, it will be recognized that the technology can be implemented in many other, different, forms, and in many different environments. The technology disclosed herein can be used in combination with other technologies and can be modified to accommodate and/or comply with changes and improvements in the applicable technology and standards referred to herein. Variations, modifications, and other implementations of what is described herein can occur to those of ordinary skill in the art without departing from the spirit and the scope of the invention as claimed. Having described the preferred embodiments of the invention, it will now become apparent to one of ordinary skill in the art that other embodiments incorporating their concepts may be used. These embodiments should not be limited to the disclosed embodiments, but rather should be limited only by the spirit and scope of the appended claims.

What is claimed is:

1. A crawler apparatus capable of being moved along a surface, the crawler apparatus comprising:

a frame having first and second ends;

a first end roller coupled to the frame and disposed adjacent the first end of the frame, the first end roller comprising a first material;

a second end roller coupled to the frame and disposed adjacent to the second end of the frame, the second end roller comprising a second material;

an idler roller comprising a third material, the idler roller being coupled to the frame and being disposed between the first and second end rollers, Wherein a space exists between any two rollers in the crawler apparatus; and a belt disposed about the first and second end rollers, the belt having an inner side capable of contacting each respective end roller, an outer side capable of contacting the surface, and a slack to permit the inner side of the belt to have first and second roller contacting portions that are in substantially continuous contact with first and second respective portions of the first and second end rollers and to permit the outer side of the belt to have a lower portion in substantially continuous contact with the surface;

wherein the idler roller is disposed so as to remain spaced a distance away from the belt when the crawler apparatus is disposed on, is moving along, or being moved along a substantially flat surface and is not experiencing motion or shock normal to the substantially flat surface;

wherein the frame, belt, first end roller, second end roller, and idler roller are constructed and arranged such that, when the crawler apparatus is placed upon or moved along the surface, bands of contact between the belt and the surface exist along the lower portion of the belt, the bands of contact each associated with a respective end roller wherein the frame, first and second end rollers, idler roller, and belt are constructed and arranged so that the bands of contact and the lower portion of the belt all lie in substantially the same plane when the crawler apparatus is placed upon or moved along the substantially flat surface and is not experiencing motion or shock normal to the substantially flat surface.

2. The crawler apparatus of claim 1, wherein the frame is capable of being coupled to a load and wherein, when the load is coupled to the frame, the first end roller, the second end roller, and the belt distribute the load to the surface along each respective band of contact.

3. The crawler apparatus of claim 1, wherein at least one of the following is selected to ensure that a contact pressure along each respective band of contact does not cause undesired damage to the surface:
   (a) the size at least one of the first and second rollers;
   (b) the first material;
   (c) the second material;
   (c) the spacing between the first and second end rollers;
   (d) the material from which the belt is made;
   (e) the thickness of material from which the belt is made;
   (f) the flexibility of the material from which the belt is made; and
   (g) a material that provides a longitudinal reinforcement to the belt.

4. The crawler apparatus of claim 3, wherein the undesired damage comprises at least one of permanent damage, temporary damage, scratching, pitting, scuffing, denting, and exceeding a predetermined level of contact pressure.

5. The crawler apparatus of claim 1, wherein the belt comprises a material having a hardness less than a hardness of the surface over which the crawler apparatus is disposed, is to be moved, or is being moved.

6. The crawler apparatus of claim 1, wherein the belt comprises at least one of:
   (a) a material capable of recovering its shape after being deformed;
   (b) an elastomeric material;
   (c) a longitudinally reinforced polymer material; and
   (d) a resilient, longitudinally reinforced material.

7. The crawler apparatus of claim 1, wherein the belt comprises at least one of KEVLAR, nylon; TEFLON; polyethylene; natural rubber; synthetic rubber; neoprene; chloroprene; urethane; polyurethane rubber; butyl rubber nitrile rubber; ethylene propylene diene monomer (EPDM) rubber; nitrile-butadiene rubber; styrene-butadiene rubber; silicone room temperature vulcanizing (RTV) rubber; fluorosilicone rubber; poly(styrene-butadiene) rubber (SBR); polychloroprene (CR); ethylene-propylene rubber (EPR); and thermoplastic elastomer (TPE).

8. The crawler apparatus of claim 1 further comprising an intermediate roller coupled to the frame and disposed between the first end roller and the second end roller, the intermediate roller comprising a fourth material, wherein:
   (a) there is a space between any two rollers in the crawler apparatus;
   (b) the belt is further disposed about at least a portion of the intermediate roller so as to have a slack to permit the inner side of the belt to have an intermediate roller contacting portion that is in substantially continuous contact with at least a portion of the intermediate roller and to permit the lower portion of the outer side of the belt to have substantially continuous contact with the surface;
   (c) the belt, frame, first end roller, second end roller, idler roller, and intermediate roller are constructed and arranged to ensure that, when the crawler, apparatus is placed upon or moved along the surface, a band of contact also exists between the belt and the surface along the lower portion of the belt; and
   (d) the intermediate roller and first and second end rollers are constructed and arranged such that their respective bands of contact and the lower portion of the belt all lie in the substantially same plane when the apparatus is placed upon or moved along the substantially flat surface and is not experiencing motion or shock normal to the substantially flat surface.

9. The crawler apparatus of claim 8, wherein at least one of the following is selected to ensure that a contact pressure along each respective band of contact does not cause undesired damage to the surface:
   (a) a size of the intermediate roller;
   (b) the fourth material; and
   (c) the spacing between the intermediate roller and at least one of the first end roller, second end roller, and idler roller.

10. The crawler apparatus of claim 9, wherein at least one of the following is selected to ensure that a contact pressure along each respective band of contact does not cause undesired damage to the surface:
   (a) a size of at least one of the first and second rollers;
   (b) the first material;
   (c) the second material;
   (d) the spacing between the first and second end rollers;
   (e) the material from which the belt is made;
   (f) a thickness of material from which the belt is made;
   (g) a flexibility of the material from which the belt is made;
   (h) a material that provides a longitudinal reinforcement to the belt;
   (i) the third material; and
   (j) the fourth material.

11. The crawler apparatus of claim 8, wherein the frame is capable of being coupled to a load and wherein, when the load is coupled to the frame, the first end roller, the second end roller, the intermediate roller, and the belt simultaneously distribute the load along each respective band of contact.

12. The crawler apparatus of claim 1 wherein the frame, belt, first end roller, and second end roller are constructed and arranged to be operable with a plurality of intermediate rollers mounted to the frame and disposed between the first end roller and the second end roller, each respective intermediate roller comprising a fourth material, wherein:
   (a) a space exists between any two rollers in the crawler apparatus;
   (b) the belt is further disposed about at least, a portion of each respective intermediate roller so as to have a slack to permit the inner side of the belt to have a plurality of respective intermediate roller contacting portions that are each in substantially continuous contact with at least a portion of each respective intermediate roller, to permit each respective intermediate roller to roll while coupled to the frame, and to permit the lower portion of the outer side of the belt to have substantially continuous contact with the surface;
   (c) the belt, frame, first end roller, second end roller, idler roller, and plurality of intermediate rollers are constructed and arranged to ensure that, when the crawler apparatus is placed upon or moved upon the surface, corresponding bands of contact also exist between the belt and the surface along the lower portion of the belt; and
   (d) wherein the bands of contact and the lower portion of the belt all lie in the substantially the same plane when the crawler apparatus is placed upon or moved along a substantially flat surface and is not experiencing motion or shock normal to the substantially flat surface.

13. The crawler apparatus of claim 1, wherein the frame further comprises at least one of:
   (a) a first pivot axis permitting the crawler apparatus to be moved along a path having a change in slope; and
   (b) a second pivot axis permitting the crawler apparatus to be moved along a path having at least one of a transverse and a longitudinal change in slope.

14. The crawler apparatus of claim 1, wherein an area of the lower portion of the belt deforms so as to contact the idler roller at least once when at least one of the following conditions exists:
   (a) the crawler apparatus is moving or being moved along a surface containing an obstacle;
   (b) the crawler apparatus is disposed on, is moving along, or being moved along, a substantially non-flat surface;
   (c) the crawler apparatus experiences motion or shock substantially normal to a surface on which the crawler apparatus is disposed, is moving, or is being moved; and
   (d) the crawler apparatus is being transported by a conveyance that experiences motion or shock substantially normal to a surface on which the crawler apparatus is disposed, is moving, or is being moved;
   wherein the contact between the idler roller and the belt results in a respective idler roller band of contact between the outer side of the belt and either the surface or the obstacle contained on the surface;
   wherein the bands of contact for the other rollers remain in substantially continuous contact with the surface; and
   wherein, except for the deformed area of the belt, the lower portion of the belt remains in substantially continuous contact with the surface.

15. The crawler apparatus of claim 14, wherein, when the idler roller contacts the belt, the idler roller cooperates with at least one of the first end roller, second end roller, and belt to distribute a load created by at least one of the following: the crawler apparatus itself; a load coupled to the crawler apparatus; and motion or shock normal to the surface on which the crawler apparatus is disposed, is moving, or is being moved.

16. The crawler apparatus of claim 1, wherein at least one of the following is selected to ensure that a contact pressure along each respective band of contact does not cause undesired damage to the surface:
   (a) a size of at least one of the first, second, and idler rollers;
   (b) at least one of the first, second, and third materials;
   (c) the spacing between any two of the first, second, and idler rollers;
   (d) the material from which the belt is made;
   (e) a thickness of material from which the belt is made;
   (f) the flexibility of the material from which the belt is made; and
   (g) a material that provides longitudinal reinforcement to the belt.

17. The crawler apparatus of claim 1, wherein the frame, belt, first end roller, and second end roller are constructed and arranged to be operable with a plurality of idler rollers disposed between the first end roller and the second end roller.

18. The crawler apparatus of claim 17 wherein each idler roller is coupled to the frame such that at least a portion of the plurality of idler rollers remain spaced a distance away from the belt when the crawler apparatus (a) is disposed on, is moving along, or being moved along the substantially flat surface; and (b) is not experiencing motion or shock normal to the substantially flat surface.

19. The crawler apparatus of claim 18, wherein a plurality of respective areas of the lower portion of the felt each deform so as to contact at least a corresponding respective portion of the plurality of idler rollers at least once when at least one of the following conditions exists:
   (a) the crawler apparatus is moving or being moved along a surface containing an obstacle;
   (b) the crawler apparatus is disposed on, is moving along, or being moved along a substantially non-flat surface;
   (c) the crawler apparatus experiences motion or shock normal to a surface on which the crawler apparatus is disposed, is moving, or is being moved; and
   (d) the crawler apparatus is being transported by a conveyance that experiences motion or shock substantially normal to a surface on which the crawler apparatus is disposed, is moving, or is being moved; and
   wherein each contact between a respective idler roller and the belt results in a respective idler roller band of contact between the outer side of the belt and the surface or the obstacle contained on the surface;
   wherein the bands of contact for the other rollers remain in substantially continuous contact with the surface; and
   wherein, except for the deformed areas of the belt, the lower portion of the belt remains in substantially continuous contact with the surface.

20. The apparatus of claim 1, wherein the first end roller has a first diameter, the second end roller has a second diameter, and wherein the belt has a thickness ranging from one half to one hundredth of at least one of the first and second diameters.

21. The apparatus of claim 1, wherein the frame has a length defined by first and second ends and a width defined by a first side and a second side and wherein the belt, idler roller, and first, and second end rollers are constructed and arranged so that each band of contact for each respective roller extends continuously from the first side of the frame to the second side of the frame.

22. The apparatus of claim 21, further comprising an intermediate roller coupled to the frame and disposed between the first end roller and the second end roller, the intermediate roller comprising a fourth material, wherein:
   (a) there is a space between any two rollers in the crawler apparatus;
   (b) the belt is further disposed about at least a portion of the intermediate roller so as to have a slack to permit the inner side of the belt to have an intermediate roller contacting portion that is in substantially continuous contact with at least a portion of the intermediate roller and to permit the lower portion of the outer side of the belt to have substantially Continuous contact with the surface;
   (c) the belt, frame, first end roller, second end roller, idler roller, and intermediate roller are constructed and arranged to ensure that, when the crawler apparatus is placed upon or moved along the surface, a band of contact also exists between outer side of the belt and surface, the band of contact extending from the first side of the frame to the second side of the frame; and
   (d) the frame, belt, intermediate roller and first and second end rollers are constructed and arranged such that the respective bands of contact and the lower portion of the belt lie in substantially the same plane when the apparatus is moved along or placed upon the substantially flat surface.

23. The crawler apparatus of claim 1, wherein the belt comprises a polymer material longitudinally-reinforced with KEVLAR.

24. An apparatus for moving a load, the apparatus comprising:
   a platform adapted for receiving a load thereon, the platform having a top side and a bottom side; and
   a plurality of crawlers removably coupled to the bottom side of the apparatus, each crawler comprising:
      a frame having first and second ends;
      a first end roller coupled to the frame and disposed adjacent the first end of the frame, the first end roller comprising a first material;
      a second end roller coupled to the frame and disposed adjacent to the second end of the frame, the second end roller comprising a second material;

an idler roller comprising a third material, the idler roller being coupled to the frame and being disposed between the first and second rollers, wherein a space exists between any two roller sin the crawler apparatus; and a belt disposed about at least a portion of the first and second end rollers, the belt having an inner side capable of contacting each respective roller, an outer side capable of contacting the surface, a slack to permit the inner side of the belt to have first and second roller contacting portions that are in substantially continuous contact with first and second respective portions of the first and second end rollers and to permit the outer side of the belt to have a lower portion in substantially continuous contact with the surface;

wherein the idler roller is disposed so as to remain spaced a distance away from the belt when the crawler apparatus is disposed on, is moving along, or being moved along a substantially flat surface and is not experiencing motion or shock normal to the substantially flat surface;

wherein the frame, belt, first end roller, second end roller, and idler roller are constructed and arranged to ensure that, when the apparatus is placed upon or moved along the surface, bands of contact between the belt and the surface exist along the lower portion of the belt, the bands of contact each associated with a respective end roller; and wherein the frame, first and second end rollers, idler roller, and belt of each crawler are constructed and arranged so that the bands of contact and the lower portion of the belt all lie in substantially the same plane when the apparatus is placed upon or moved along the substantially flat surface and is not experiencing motion or shock normal to the substantially flat surface.

25. The apparatus of claim 24 wherein at least one of the following is selected to ensure that a contact pressure along each respective band of contact does not cause undesired damage to the surface:
(a) a size of at least one of the first and second rollers;
(b) the first material:
(c) the second material;
(d) the spacing between the first and second end rollers;
(e) the material from which the belt is made;
(f) a thickness of material from which the belt is made;
(g) a flexibility of the material from which the belt is made;
(h) a material that provides a longitudinal reinforcement to the belt; and
(i) the third material.

26. The apparatus of claim 24, wherein at least a portion of the plurality of crawlers have a crawler frame that further comprises at least one of:
(a) a respective first pivot axis permitting the apparatus to be moved along a path having a change in slope; and
(b) a respective a second pivot axis permitting the apparatus to be moved along a path having at least one of a transverse and a longitudinal change in slope.

27. The apparatus of claim 24, wherein the belt of at least a portion of the plurality of crawlers comprises at least one of
(a) a material capable of recovering its shape after a deforming force is removed;
(b) an elastomeric material;
(c) a material haying a hardness less than a hardness of the surface over which the apparatus is disposed, is to be moved, or is being moved;
(d) a resilient material; and
(e) a longitudinally reinforced polymer material.

28. The apparatus of claim 24, wherein at least one of the plurality of crawlers further comprises an intermediate roller coupled to the frame of the at least one crawler, the intermediate roller being disposed between the first and second end rollers of the at least one crawler and comprising a fourth material, wherein:
(a) there is a space between any two rollers in the crawler apparatus;
(b) the belt is further disposed about at least a portion of the intermediate roller so as to have a slack to permit the inner side of the belt to have an intermediate roller contacting portion that is in substantially continuous contact with the intermediate roller so as to allow the intermediate roller to roll while coupled to the frame and to permit the lower portion of the outer side of the belt to have substantially continuous contact with the surface;
(c) the belt, frame, first end roller, second end roller, idler roller, and intermediate roller are is constructed and arranged to ensure that, when the crawler apparatus is placed upon or moved along the surface, a band of contact also exists between the belt and the surface along the lower portion of the belt; and
(d) the intermediate roller and first and second end rollers are constructed and arranged such that their respective bands of contact and the lower portion of the belt all lie in the substantially same plane when the apparatus is placed upon or moved along the substantially flat surface and is not experiencing motion or shock normal to the substantially flat surface.

29. The apparatus of claim 24, wherein an area of the lower portion of the belt deforms so as to contact the idler roller at least once when at least one of the following conditions exists:
(a) the apparatus is moving or being moved along a surface containing an obstacle;
(b) the apparatus is disposed on, is moving along, or being moved along a substantially non-flat surface;
(c) the apparatus experiences motion or shock normal to a surface on which the apparatus is disposed, is moving, or is being moved; and
(d) the apparatus is being transported by a conveyance that experiences motion or shock substantially normal to a surface on which the apparatus is disposed, is moving, or is being moved;
wherein the contact between the idler roller and the belt results in a respective idler roller band of contact between the outer side of the belt and the surface or the obstacle contained on the surface;
wherein the bands of contact for the other rollers remain in substantially continuous contact with the surface; and
wherein, except for the deformed area of the belt, the lower portion of the belt remains in substantially continuous contact with the surface.

30. The crawler apparatus of claim 29, wherein, when the idler roller contacts the belt, the idler roller cooperates with the plurality of first end rollers, second end rollers, and belts of the plurality of crawlers to distribute a load created by at least one of the following: the apparatus itself; the crawler to which the idler roller is mounted; a load coupled to the apparatus; and motion or shock normal to the surface on which the apparatus is disposed, is moving, or is being moved.

31. The apparatus of claim 24, wherein the belt comprises a polymer material longitudinally reinforced with KEVLAR.

* * * * *

UNITED STATES PATENT AND TRADEMARK OFFICE
CERTIFICATE OF CORRECTION

PATENT NO. : 7,464,997 B2
APPLICATION NO. : 11/195149
DATED : December 16, 2008
INVENTOR(S) : Jonathan T. Longley It is certified that error appears in the above-identified patent and that said Letters Patent is hereby corrected as shown below:

Col. 1, line 52, delete "Hillman" and replace with -- Hilman --.

Col. 2, line 32, delete ", etc., traverses over a bump, etc.)." and replace with -- , etc.). --.

Col. 3, line 12, delete "denting, scuffing, denting," and replace with -- scuffing --.

Col. 3, line 22, delete "made" and replace with -- made. --.

Col. 3, line 30, delete "rubber nitrile" and replace with -- rubber; nitrile --.

Col. 5, line 17, delete "isometric of" and replace with -- isometric view of --.

Col. 5, line 48, delete "cross sectional" and replace with -- cross-sectional --.

Col. 5, line 53, delete "cross sectional" and replace with -- cross-sectional --.

Col. 6, line 6, delete "isometric of" and replace with -- isometric view of --.

Col. 6, line 42, delete "roller 16" and replace with -- rollers 16a, 16e --.

Col. 6, line 58, delete "by Society of Automotive Engineers (SAL)" and replace with -- by the Society of Automotive Engineers (SAE), --.

Col. 7, line 53, delete "rubber nitrile" and replace with -- rubber; nitrile --.

Col. 8, line 44, delete "FIGS. 4A-4B the" and replace with -- FIGS. 4A-4B, the --.

Col. 9, line 13, delete "roller" and replace with -- rollers. --.

Col. 9, line 14, delete "roller" and replace with -- rollers. --.

Col. 9, line 14, delete "is made" and replace with -- are made --.

Col. 9, line 51, delete "pressures" and replace with -- pressure --.

Col. 10, line 56, delete "cross sectional" and replace with -- cross-sectional --.

Col. 10, line 64, delete "cross sectional" and replace with -- cross-sectional --.

UNITED STATES PATENT AND TRADEMARK OFFICE
CERTIFICATE OF CORRECTION

| | | |
|---|---|---|
| PATENT NO. | : 7,464,997 B2 | |
| APPLICATION NO. | : 11/195149 | |
| DATED | : December 16, 2008 | |
| INVENTOR(S) | : Jonathan T. Longley | |

It is certified that error appears in the above-identified patent and that said Letters Patent is hereby corrected as shown below:

Col. 11, line 32, delete "brands names" and replace with -- brands, names --.

Col. 12, line 31, delete ", Wherein" and replace with -- , wherein --.

Col. 12, line 55, delete "roller" and replace with -- roller; --.

Col. 13, line 5, delete "the size" and replace with -- a size --.

Col. 13, line 8, delete "the spacing" and replace with -- a spacing --.

Col. 13, line 10, delete "the thickness" and replace with -- a thickness --.

Col. 13, line 11, delete "the flexibility" and replace with -- a flexibility --.

Col. 13, line 34, delete "rubber nitrile" and replace with -- rubber; nitrile --.

Col. 13, line 57, delete "crawler," and replace with -- crawler --.

Col. 14, line 39, delete "at least," and replace with -- at least --.

Col. 15, line 8, delete "along, a" and replace with -- along a --.

Col. 17, line 4, delete "roller sin" and replace with -- rollers in --.

Col. 17, line 37, delete "material:" and replace with -- material; --.

Col. 17, line 51, delete "respective a second" and replace with -- respective second --.

Col. 17, line 55, delete "of" and replace with -- of: --.

UNITED STATES PATENT AND TRADEMARK OFFICE
CERTIFICATE OF CORRECTION

PATENT NO.       : 7,464,997 B2
APPLICATION NO.  : 11/195149
DATED            : December 16, 2008
INVENTOR(S)      : Jonathan T. Longley It is certified that error appears in the above-identified patent and that said Letters Patent is hereby corrected as shown below:

Col. 18, line 17, delete "are is" and replace with -- are --.

Signed and Sealed this

Twenty-third Day of June, 2009

JOHN DOLL
*Acting Director of the United States Patent and Trademark Office*